(12) United States Patent  
Bonhôte et al.

(10) Patent No.: US 8,259,413 B2
(45) Date of Patent: Sep. 4, 2012

(54) WRITE HEAD WITH SELF-ALIGN LAYER AND A METHOD FOR MAKING THE SAME

(75) Inventors: Christian René Bonhôte, San Jose, CA (US); Quang Le, San Jose, CA (US); Jeffrey S. Lille, Sunnyvale, CA (US); Vladimir Nikitin, Campbell, CA (US); Aron Pentek, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 717 days.

(21) Appl. No.: 12/347,058

(22) Filed: Dec. 31, 2008

(65) Prior Publication Data

US 2010/0165513 A1 Jul. 1, 2010

(51) Int. Cl.
 *G11B 5/127* (2006.01)
 *H01L 43/08* (2006.01)
 *H01L 43/12* (2006.01)
 *H01F 10/08* (2006.01)

(52) U.S. Cl. ............ 360/125.6; 360/125.09; 360/125.1; 360/125.13; 360/125.14; 29/603.01; 29/603.07; 29/603.13; 29/603.14; 29/603.15

(58) Field of Classification Search .................. None
See application file for complete search history.

(56) References Cited

U.S. PATENT DOCUMENTS

| 7,061,717 | B2 | 6/2006 | Takano .................... 360/126 |
| 7,239,480 | B2 | 7/2007 | Hirabayashi et al. ........ 360/126 |
| 7,877,859 | B2 * | 2/2011 | Hsiao et al. ............... 29/603.13 |
| 8,031,433 | B2 * | 10/2011 | Yan et al. .................. 360/125.03 |
| 2004/0233577 | A1 * | 11/2004 | Takano ....................... 360/125 |
| 2005/0219750 | A1 | 10/2005 | Matono et al. ............... 360/126 |
| 2007/0146929 | A1 | 6/2007 | Maruyama et al. .......... 360/125 |
| 2007/0146931 | A1 * | 6/2007 | Baer et al. ................... 360/126 |
| 2008/0297952 | A1 * | 12/2008 | Kameda et al. .............. 360/317 |
| 2009/0117407 | A1 * | 5/2009 | Zheng et al. ................ 428/810 |
| 2009/0154009 | A1 * | 6/2009 | Le ............................... 360/110 |
| 2009/0154021 | A1 * | 6/2009 | Nunokawa et al. ........ 360/234.3 |
| 2009/0168236 | A1 * | 7/2009 | Jiang et al. ................... 360/110 |
| 2009/0168237 | A1 * | 7/2009 | Hsiao et al. .................. 360/110 |
| 2009/0168257 | A1 * | 7/2009 | Hsiao et al. .................. 360/319 |
| 2011/0096434 | A1 * | 4/2011 | Hsiao et al. .................... 360/75 |

OTHER PUBLICATIONS

Restriction/Election Requirement from U.S. Appl. No. 12/975,157 dated Jun. 4, 2012.

* cited by examiner

*Primary Examiner* — Kevin Bernatz
(74) *Attorney, Agent, or Firm* — Zilka-Kotab, PC

(57) ABSTRACT

A system according to one embodiment includes a write pole having an end region positioned towards an air bearing surface, a first flare point, and a second flare point positioned between the air bearing surface and the first flare point; and a shield positioned above the write pole, wherein a cross sectional area of the write pole at a point between the first and second flare points along a plane passing through the write pole and oriented about parallel to the air bearing surface is greater than a cross sectional area of the end region of the write pole along a plane oriented parallel to the plane passing through the second flare point. Additional systems and methods are also presented.

25 Claims, 29 Drawing Sheets

2nd Flare View

Top Down View

ABS View

ABS 2nd Flare  Cross Section

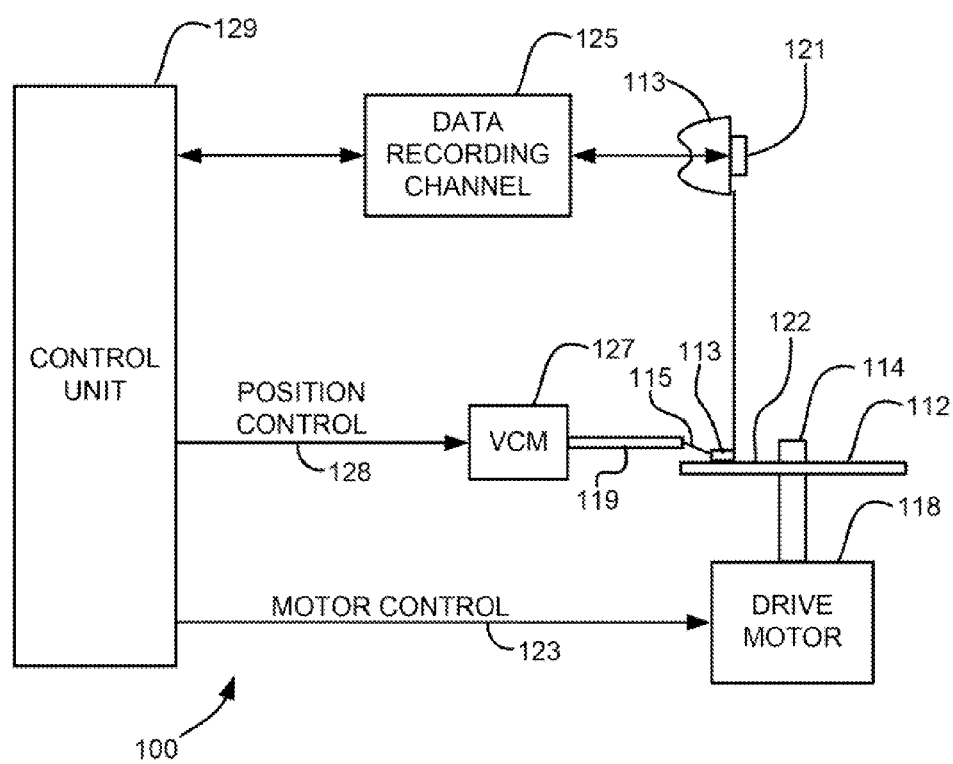
FIG. 1
(conventional)

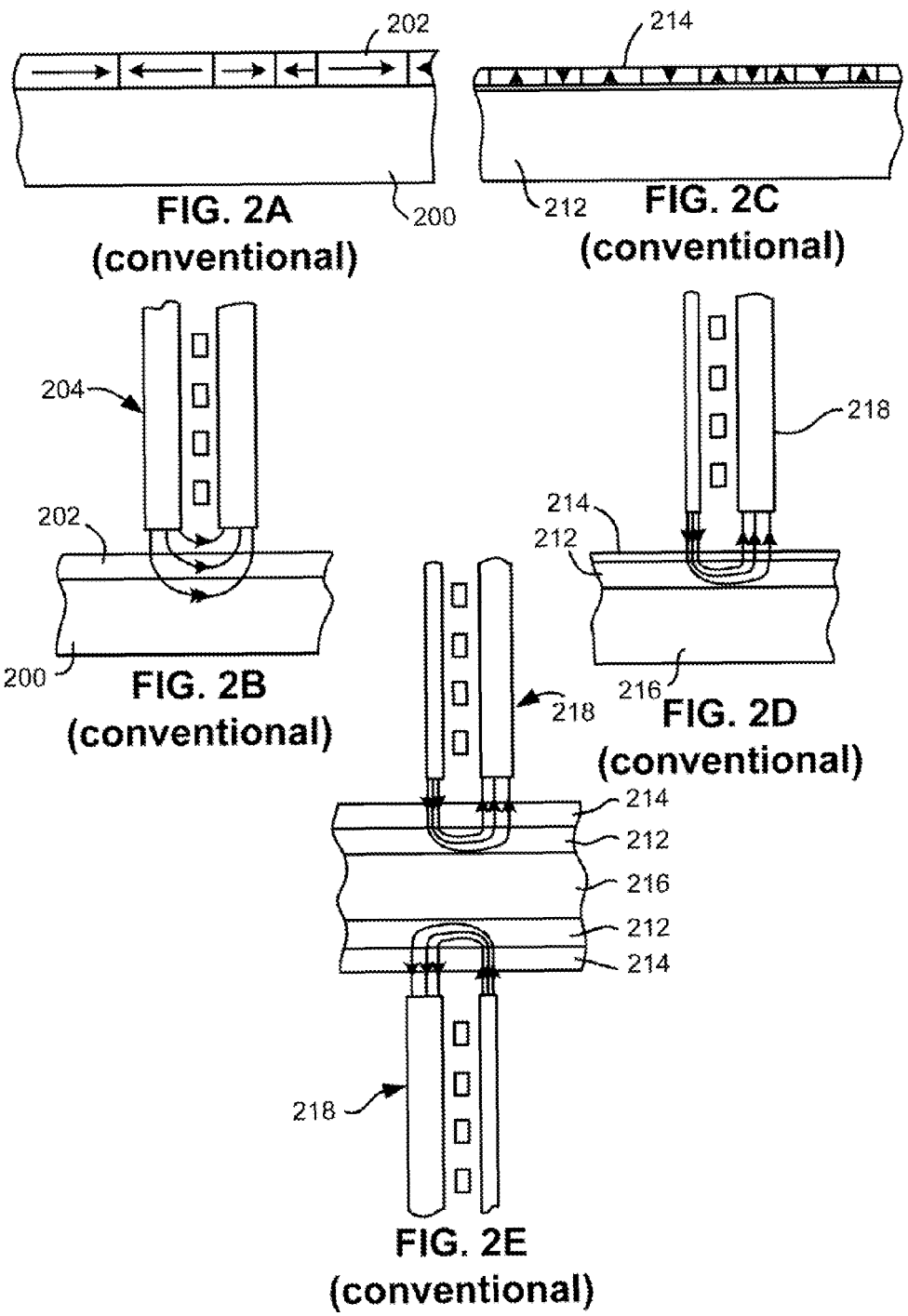
FIG. 2A (conventional)
FIG. 2B (conventional)
FIG. 2C (conventional)
FIG. 2D (conventional)
FIG. 2E (conventional)

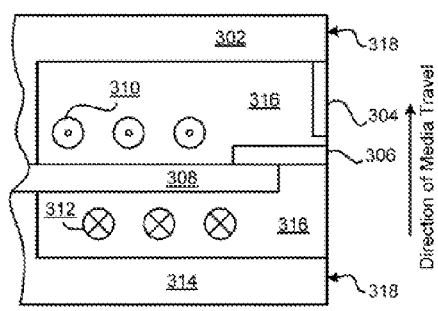
FIG. 3A
(conventional)
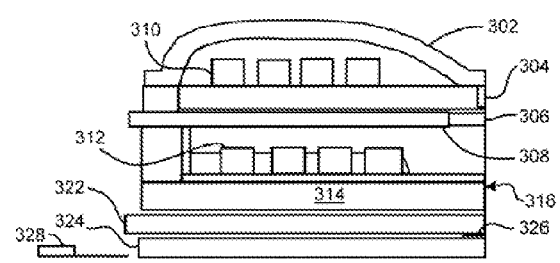
FIG. 3B
(conventional)
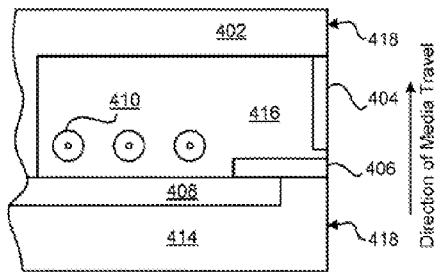
FIG. 4A
(conventional)
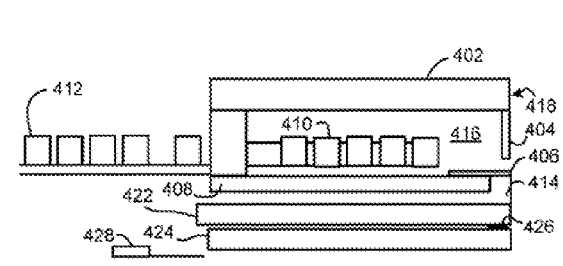
FIG. 4B
(conventional)

WRITE HEAD WITH SELF-ALIGN LAYER AND A METHOD FOR MAKING THE SAME

FIELD OF THE INVENTION

The present invention relates to thin film processing and structures, and more particularly, this invention relates to magnetic write transducers and fabrication thereof.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

In typical systems, recession is created after lapping and pre-carbon etching processes. This creates a distance between the transducers and the disk surface. Thermal fly-height control (TFC) is a method of altering this distance between the transducers and the disk surface by heating the components of the reader/writer causing thermal expansion of the materials, which results in the reader/writer transducers protruding closer to the surface of the hard disk. The transducers are moved closer to the disk surface to enable proper reading and writing of the tracks.

There are different types of write heads for writing information to a hard disk drive or other rotating disk storage system. One particularly useful write head configuration is the shielded perpendicular write head. In the shielded perpendicular write head, the placement of the write pole with respect to the shield affects the strength of the effective write field and field gradient. Therefore tight alignment of these structures would greatly enhance the effectiveness of the resulting write head. Known methods have heretofore failed to provide the desirable tight alignment.

SUMMARY OF THE INVENTION

A system according to one embodiment includes a write pole having an end region positioned towards an air bearing surface, a first flare point, and a second flare point positioned between the air bearing surface and the first flare point; and a shield positioned above the write pole, wherein a cross sectional area of the write pole at a point between the first and second flare points along a plane passing through the write pole and oriented about parallel to the air bearing surface is greater than a cross sectional area of the end region of the write pole along a plane oriented parallel to the plane passing through the second flare point.

A system according to another embodiment includes a write pole having an end region positioned towards an air bearing surface, a first flare point, and a second flare point positioned between the air bearing surface and the first flare point; and a shield positioned above the write pole, wherein a width of the write pole at the second flare point is greater than a width of the write pole in the end region, wherein a bottom of the write pole at the second flare point is lower than a bottom of the write pole in the end region.

A method according to one embodiment includes forming a write pole having an end region and a first flare point spaced from the end region, the end region being positioned towards an expected air bearing surface; removing material from below a second flare point of the write pole for forming a gap thereunder, the second flare point being positioned between the end region and the first flare point; and depositing material in the gap for increasing a cross sectional area of the write pole at a point between the first and second flare points, wherein the material is not deposited under the end region.

A method according to another embodiment includes forming a write pole having an end region and a first flare point spaced from the end region, the end region being positioned towards an expected air bearing surface; removing material from below a second flare point of the write pole for forming a gap thereunder, the second flare point being positioned between the end region and the first flare point; depositing material in the gap and along sides of the write pole for increasing a cross sectional area of the write pole at a point between the first and second flare points, wherein the material is not deposited under and along sides of the end region; forming a layer of nonmagnetic material over the write pole at a point between the first and second flare points, wherein the nonmagnetic material is not formed over the end region of the write pole; and forming a wrap around shield above the write pole.

Other aspects, advantages and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 1 is a simplified drawing of a magnetic recording disk drive system.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2F is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

Figure 5:
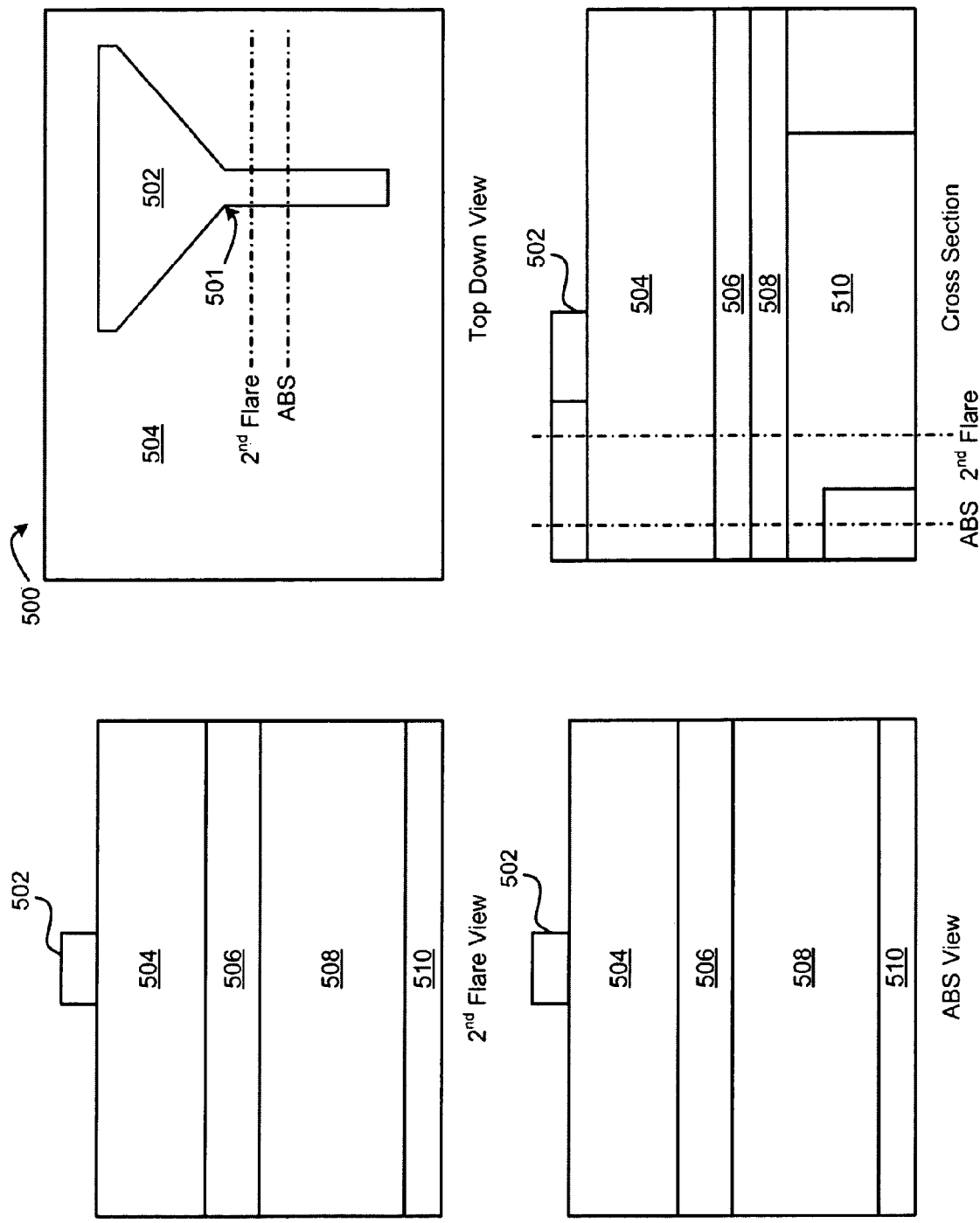
FIGS. 5-28 illustrate structures formed utilizing techniques described herein in accordance with various embodiments, and possibly in various stages of processing according to certain embodiments.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of thin film fabrication methods, as well as resultant structures formed therefrom including components for magnetic storage systems.

While much of the following description will describe fabrication of a pole for a perpendicular magnetic writer, it should be understood that this is done by way of example only, and the teachings herein have broad application to thin film processing in all areas.

In one general embodiment, a system is provided. The system comprises a write pole having an end region positioned towards an air bearing surface, a first flare point, and a second flare point positioned between the air bearing surface and the first flare point; and a shield positioned above the write pole, wherein a cross sectional area of the write pole at a point between the first and second flare points along a plane passing through the write pole and oriented about parallel to the air bearing surface is greater than a cross sectional area of the end region of the write pole along a plane oriented parallel to the plane passing through the second flare point.

In another general embodiment, a system is provided. The system comprises a write pole having an end region positioned towards an air bearing surface, a first flare point, and a second flare point positioned between the air bearing surface and the first flare point; and a shield positioned above the write pole, wherein a width of the write pole at the second flare point is greater than a width of the write pole in the end region, wherein a bottom of the write pole at the second flare point is lower than a bottom of the write pole in the end region.

In another general embodiment, a method is provided. The method comprises forming a write pole having an end region and a first flare point spaced from the end region, the end region being positioned towards an expected air bearing surface; removing material from below a second flare point of the write pole for forming a gap thereunder, the second flare point being positioned between the end region and the first flare point; and depositing material in the gap for increasing a cross sectional area of the write pole at a point between the first and second flare points, wherein the material is not deposited under and the end region.

In another general embodiment, a method is provided. The method comprises forming a write pole having an end region and a first flare point spaced from the end region, the end region being positioned towards an expected air bearing surface; removing material from below a second flare point of the write pole for forming a gap thereunder, the second flare point being positioned between the end region and the first flare point; depositing material in the gap and along sides of the write pole for increasing a cross sectional area of the write pole at a point between the first and second flare points, wherein the material is not deposited under and along sides of the end region; forming a layer of nonmagnetic material over the write pole at a point between the first and second flare points, wherein the nonmagnetic material is not formed over the end region of the write pole; and forming a wrap around shield above the write pole.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a helical coil 410, which wraps around to form helical coil 412. Also, sensor shields 422, 424 are shown. The sensor 426 is typically positioned between the sensor shields 422, 424.

In FIGS. 3B and 4B, an optional heater 328, 428, respectively, is shown near the non-ABS side of the magnetic head. A heater 328, 428 may also be included in the magnetic heads shown in FIGS. 3A and 4A. The position of this heater may vary based on design parameters such as where the protrusion is desired, coefficients of thermal expansion of the surrounding layers, etc.

A preferred write head configuration is the shielded perpendicular write head. To enable better manufacturing of the write pole in a shielded perpendicular write head, self aligning may be used. This can be achieved by defining a secondary flare point on the structure by electroplating then using the placement of the secondary flare point to define the edge placement of the shield structure. The secondary flare point is preferably formed after the write pole has been formed. The methods and structures disclosed herein aim at forming the secondary flare point below and on the side of the write pole. Modeling indicates that there is a better advantage for forming the secondary flare point below and on the side of the write pole than elsewhere. The self align processes for forming write poles for shielded perpendicular write heads disclosed herein include a secondary flare point that is formed at the bottom and side of the write pole to reduce alignment tolerance.

FIGS. 5-28 show four views in each figure of an embodiment in various stages of processing. In a particularly preferred embodiment of one method, the processing starts with FIG. 5 and ends with FIG. 28, but any conceivable ordering of the processing steps is possible, and the order shown herein is not meant to limit the invention in any manner. Moreover, additional, fewer, and/or substitutive steps may be performed. Further, materials listed herein may be substituted or used in conjunction with other materials. Starting in the upper right of each figure and moving clockwise, the views are Top Down, Cross Section, ABS and $2^{nd}$ Flare, as indicated under each view in each figure. The ABS and $2^{nd}$ Flare views are taken from the ABS and $2^{nd}$ Flare lines, respectively, shown on the Top Down and Cross Section views in each figure.

Now referring to FIG. 5, several thin film layers are shown from four views. This may be a starting point for defining a write pole for a shielded perpendicular write head. The upper layer is a photoresist layer 502 that is deposited so that a shape can be produced from the layers below. Below the photoresist layer 502 is a layer of durimide 504. Below the durimide layer 504 is a carbon layer 506, followed by a full film laminate layer 508, and below the laminate layer 508 is the substrate 510 on which all layers may be formed. As is shown in the Top Down view, the photoresist layer 502 is in the shape of a write pole.

Once the photoresist layer 502 is in place, reactive-ion etching (RIE) or any other technique that can remove material with relative precision is used to remove the durimide layer 504 and carbon layer 506 that are exposed, i.e., not under the photoresist layer 502, until the laminate layer 508 is reached. In this embodiment, the photoresist layer 502 is used as a template from which the write pole is defined. Whatever shape the photoresist layer 502 is, that is what shape the write pole will become.

Figure 6:
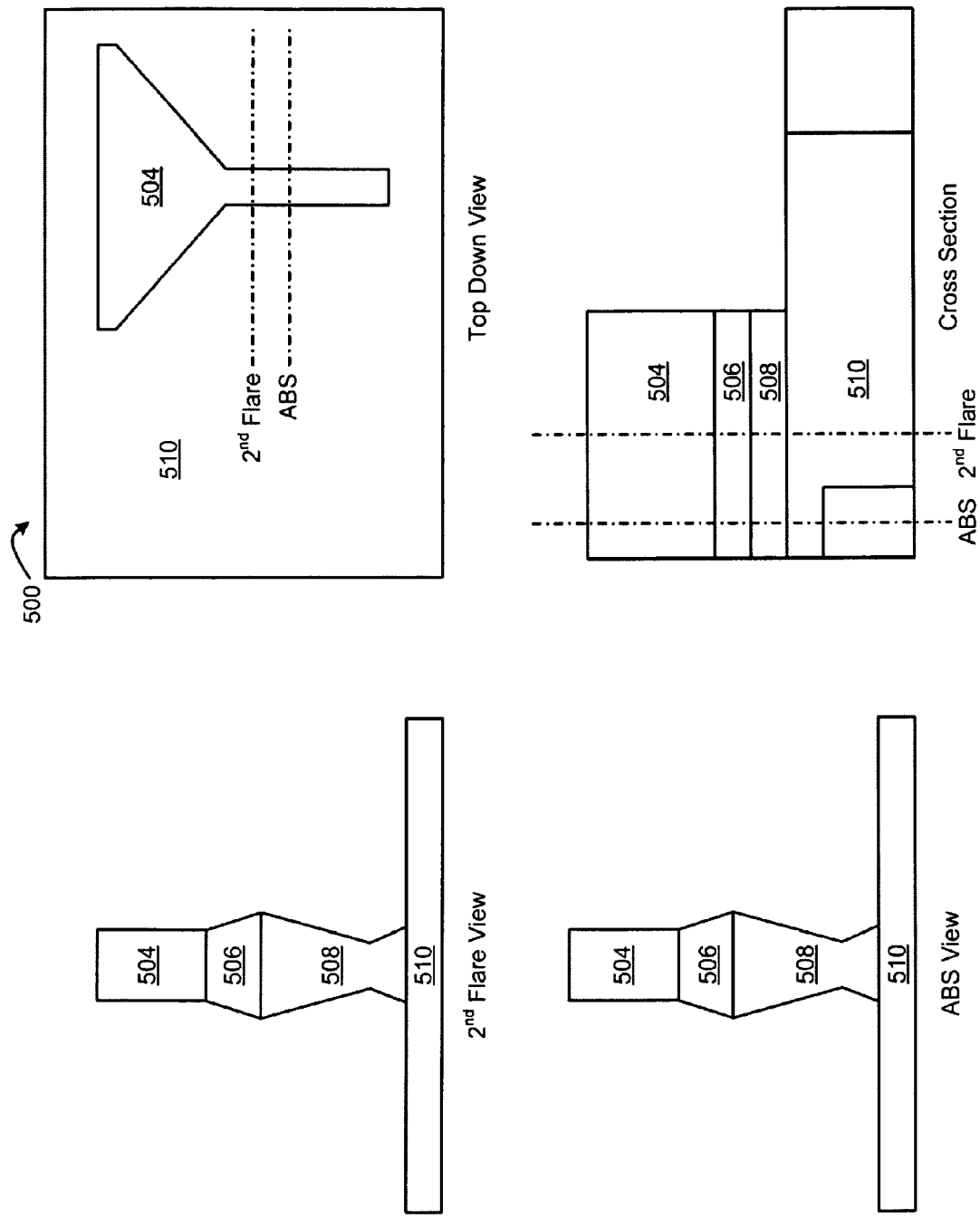

After the RIE is performed, the laminate layer 508 is preferably removed at multiple angles, preferably by milling, where it is not covered by the photoresist layer 502, resulting in a structure as shown in FIG. 6.

In FIG. 6, the result of the milling and RIE is shown, where layers have been removed down to the substrate 510 except those previously under the photoresist layer. In addition, the photoresist layer is removed, preferably by milling, to expose the durimide layer 504. Next, the durimide layer 504 is removed, preferably through anisotropic wet etching, such as with tetramethylammonium hydroxide (TMAH) to remove redeposited materials during milling. In addition, the durimide layer 504 may be removed through a N-methyl-2-pyrrolidone (NMP) strip, preferably applied hot, as durimide is soluble in NMP, so using NMP can remove substantially all durimide from the structure.

Figure 7:
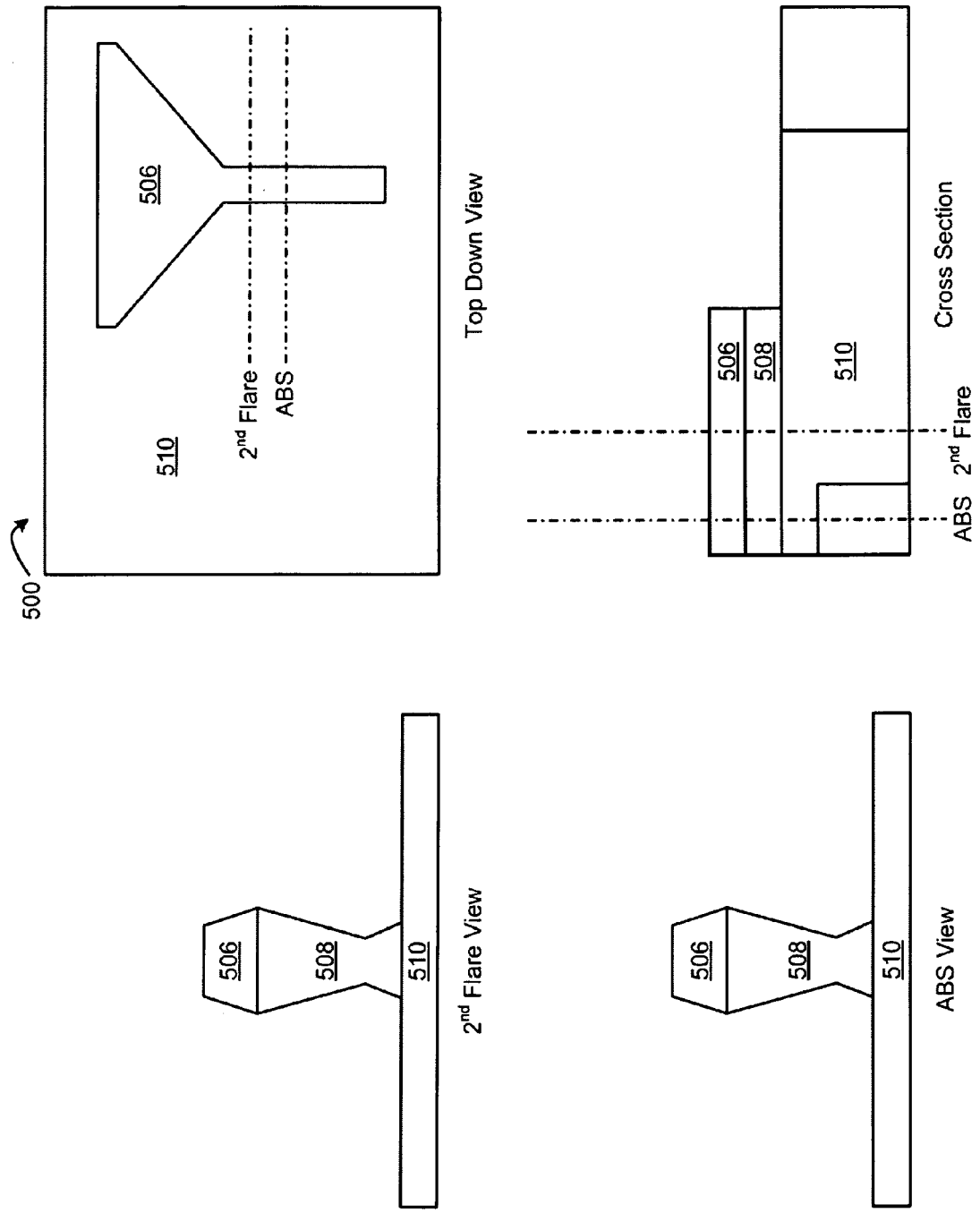

After the durimide layer 504 is removed, the structure 500 resembles that shown in FIG. 7. Referring to FIG. 7, the remaining layers after previous processing may be a carbon layer 506 and a laminate layer 508 which acts as the pole, above a substrate 510. To further define the write pole, a photoresist layer (512, FIG. 8) may be added above the existing layers to define an area where future processing may take place, at each end of the pole structure, as they are left uncovered by the photoresist layer (512, FIG. 8).

Figure 8:
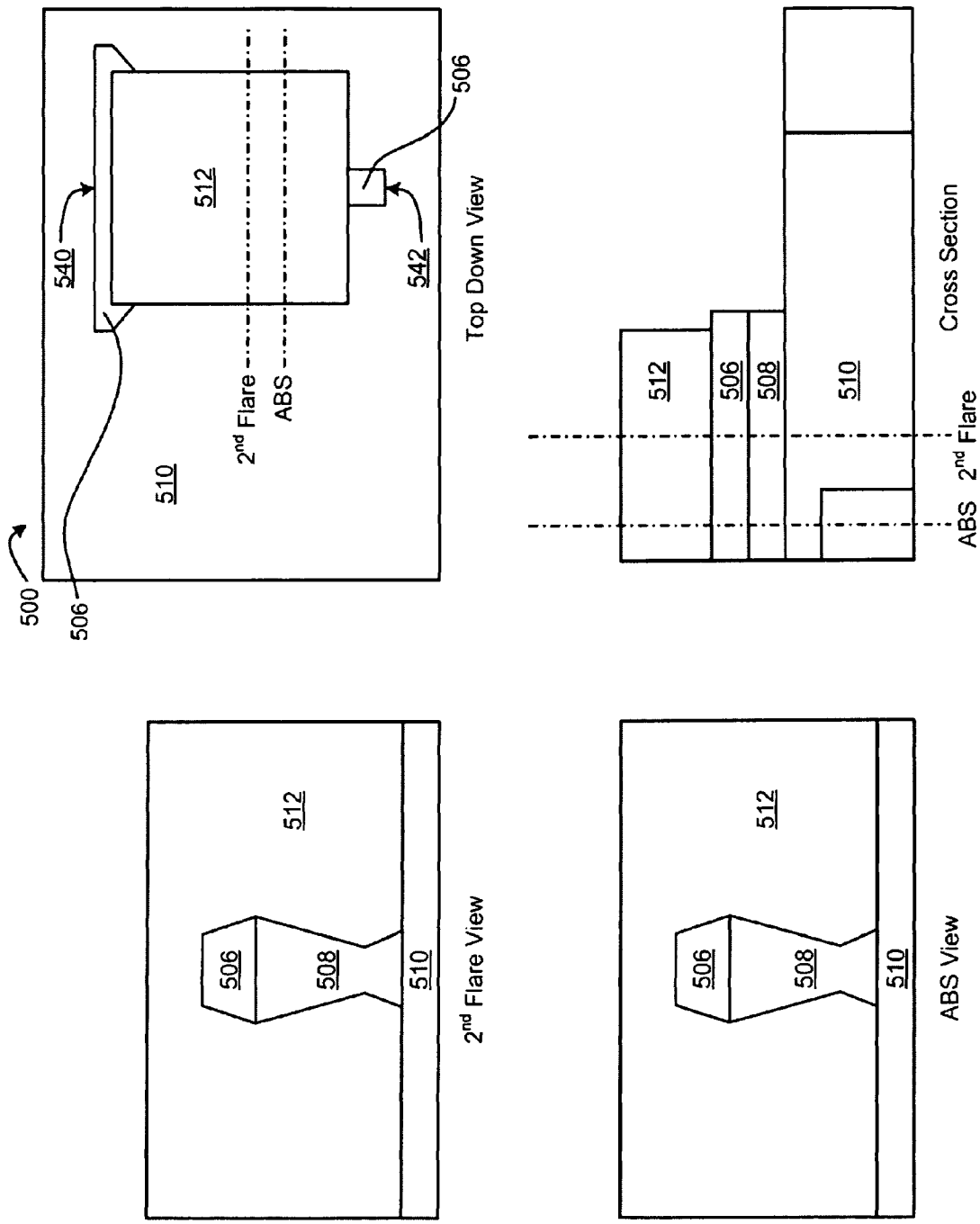

In FIG. 8, the resulting photoresist layer 512 is shown above the pole structure and substrate 510. As shown in the Top Down view, the photoresist layer 512 does not cover the back end 540 of the pole structure and the front end 542 of the pole structure. As can be seen in the Cross Section view, the front end 542 of the pole structure is not shown, as the entire structure 500 will be processed so that the ABS is exposed after the structure 500 is processed as desired. Also, as seen in the $2^{nd}$ Flare view and the ABS view, the pole structure is identical at each point in FIG. 8. From this structure, as shown in FIG. 8, RIE may be performed to define the layers and prepare the structure 500 for a full film seed layer (514, FIG. 9).

Note that in this and other embodiments, the end region does not necessarily encompass the entire portion of the write pole between its ABS-adjacent end and the second flare point, though it may in some embodiments. Rather, the end region in many embodiments includes some sub-portion of the write pole between its ABS-adjacent end and the second flare point.

Figure 9:
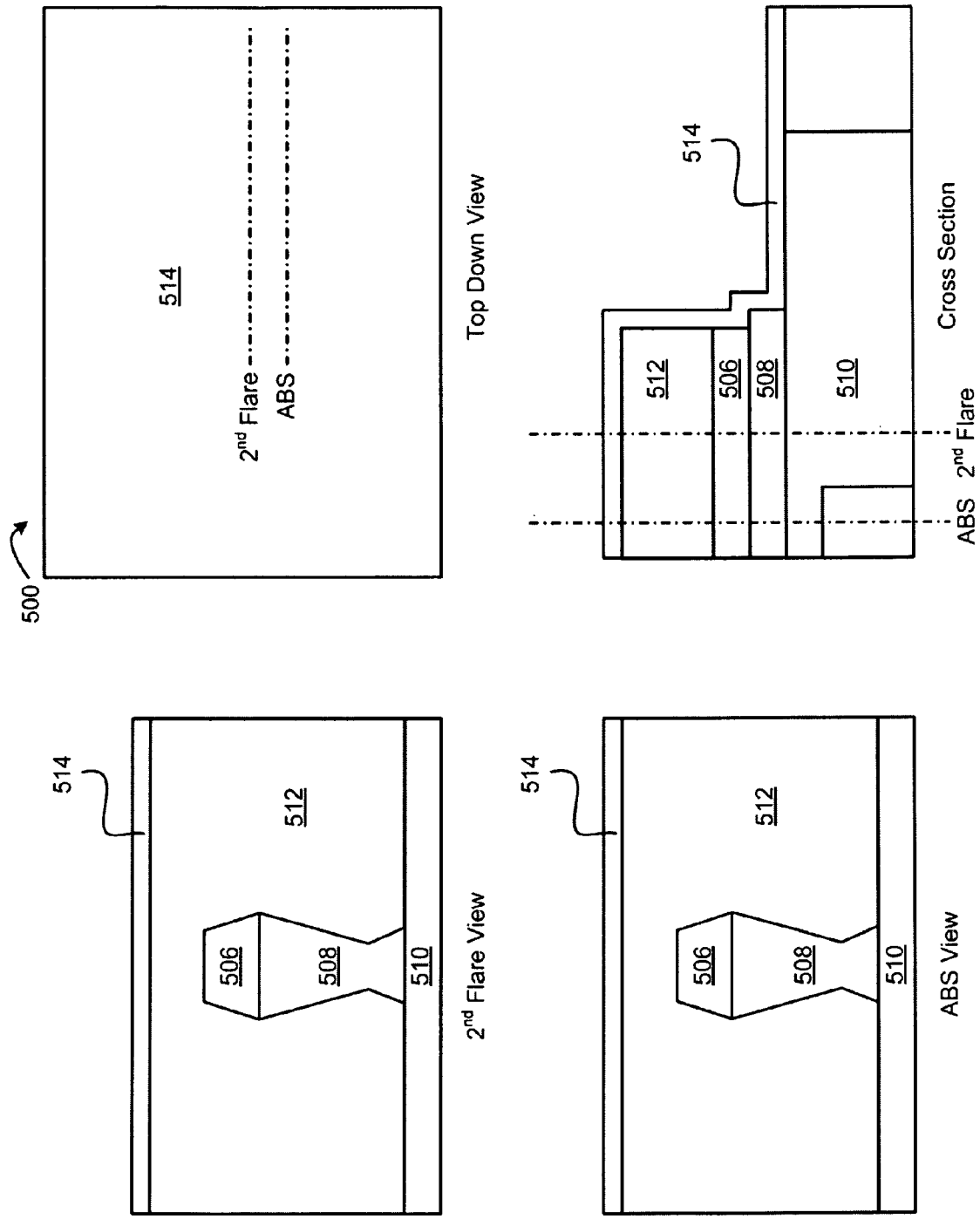

In FIG. 9, the full film seed layer 514 is shown deposited above all layers. It completely covers the entire upper surface of the structure 500, and may be applied with any technique known to those skilled in the relevant art of seed layer deposition. This deposition of seed layer 514 is intended to apply a seed layer to the back end (540, FIG. 8) of the pole structure and the front end (542, FIG. 8) of the pole structure that were left exposed by the photoresist layer (512, FIG. 8).

Figure 10:
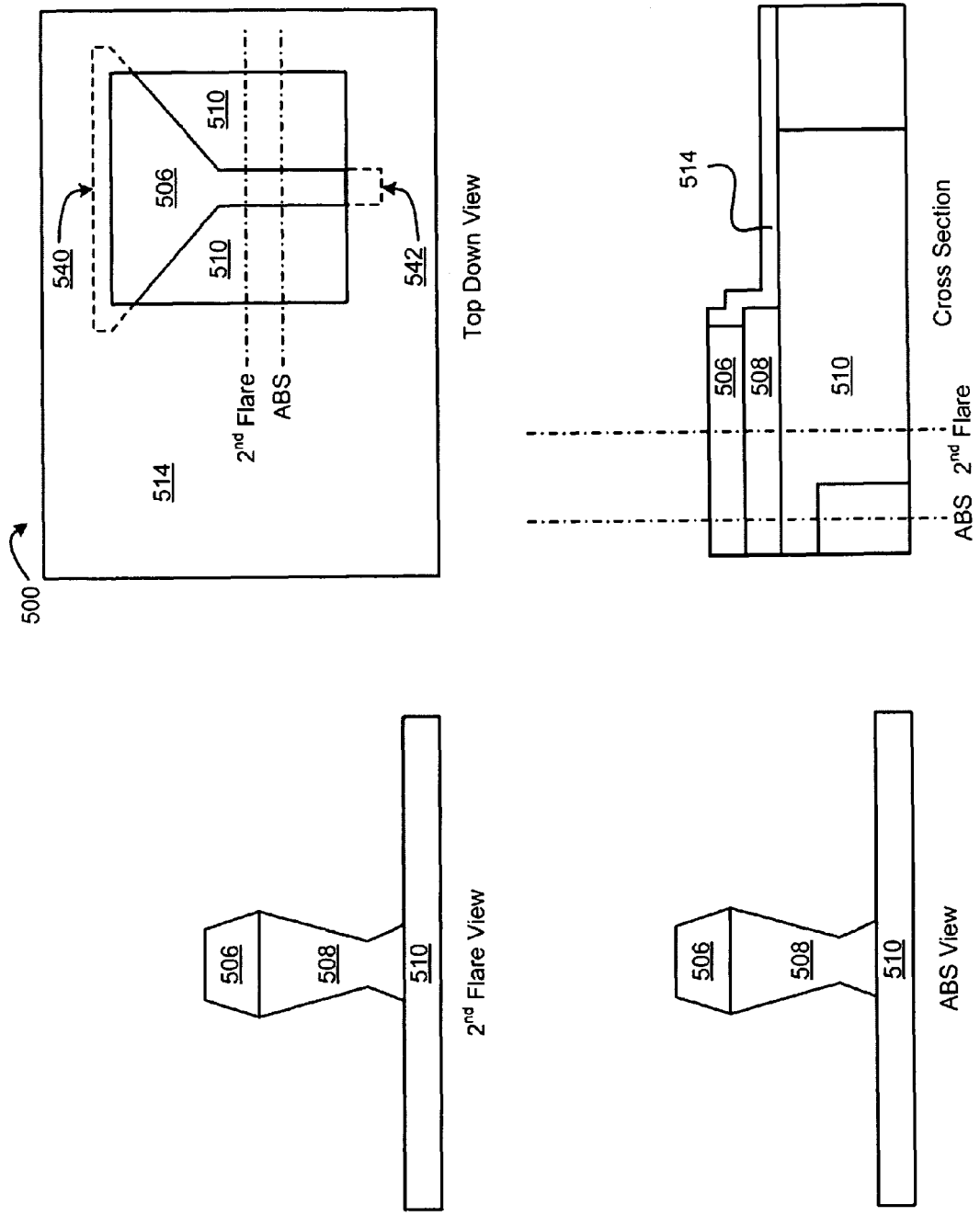

Now referring to FIG. 10, the photoresist layer (512, FIG. 8) may be removed through processing, such as ash, wrinkle bake, and lift-off, so that the seed layer 514 is once again exposed. Ash can refer to plasma ashing where a monatomic reactive species is generated, such as oxygen or fluorine, which combines with the photoresist layer (512, FIG. 8) to form ash, and then removed via a vacuum pump. Any other type of ashing may also be used, or any other technique for removing photoresist, as is known in the relevant art. As can be seen by the hatched lines in the Top Down view, the back end 540 of the pole structure and the front end 542 of the pole structure are covered with seed layer 514, while the remaining pole structure 500 is not. As can be seen from the ABS and $2^{nd}$ Flare views, the seed layer 514 and photoresist layer (512, FIG. 8) are completely removed. From this embodiment, the structure 500 may be further processed, preferably by etching a pole bridge (516, FIG. 11).

Figure 11:
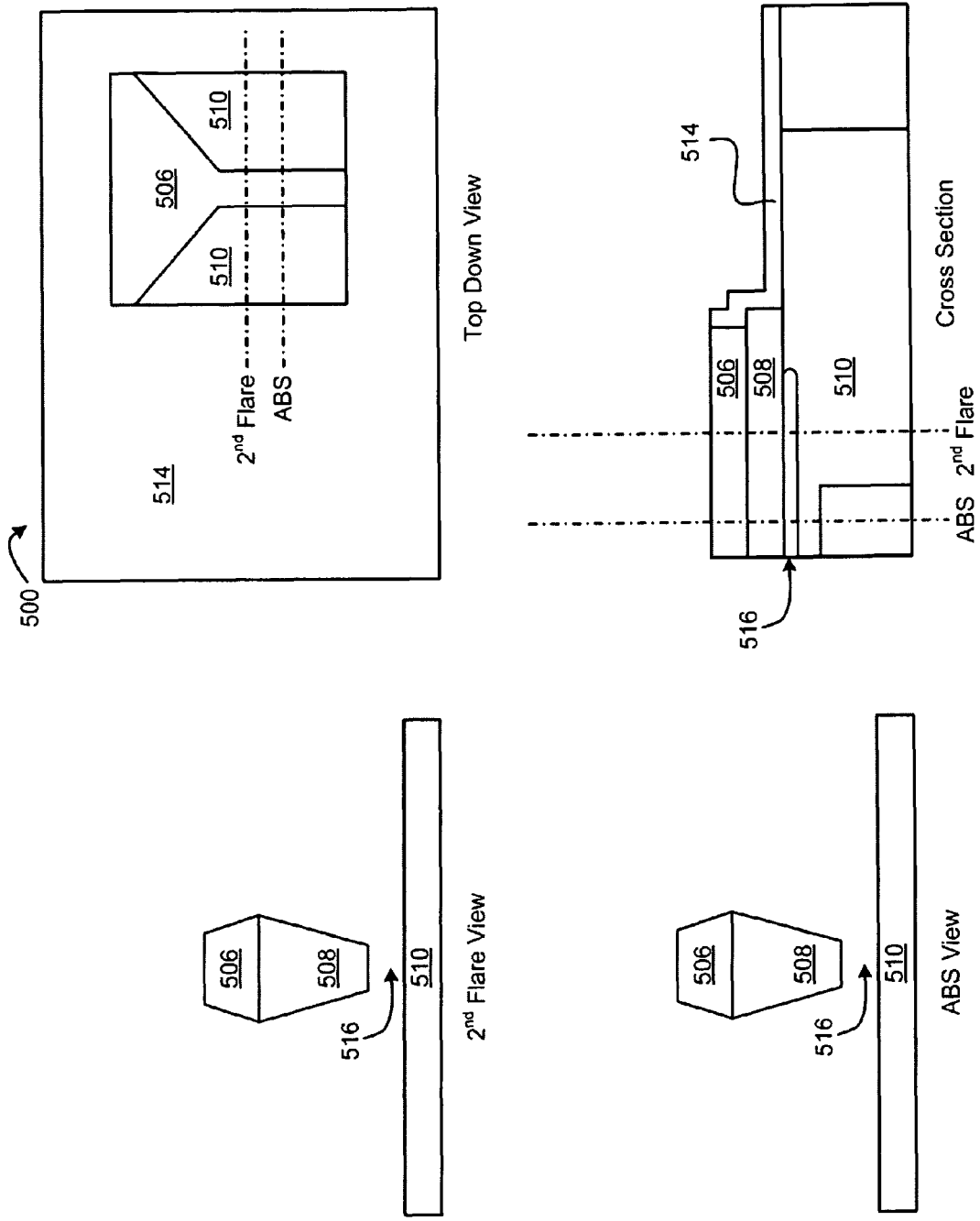

In FIG. 11, the pole bridge 516 is shown under the laminate layer 508 which acts as the pole, and above the substrate. To form the pole bridge 516, an alumina developer etch may be used by employing a suitable solvent, such as potassium hydroxide, to etch away exposed alumina material in the desired locations. Other areas are protected from the etchant by the seed layer 514.

Figure 12:
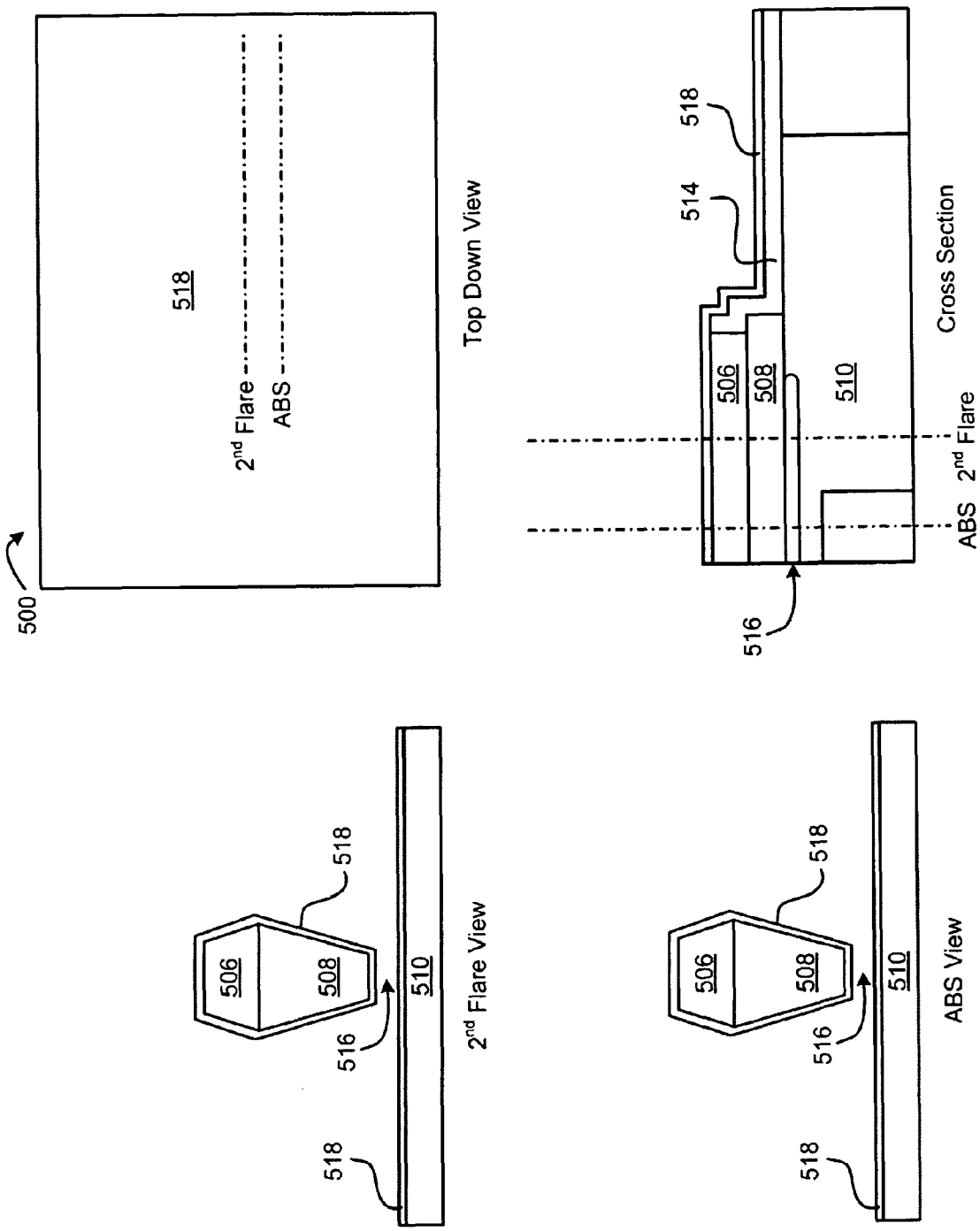

Now that the pole bridge 516 has been formed, as optional, a layer of a silicon-oxygen-nitrogen compound, such as silicon nitride (SiN), silicon-oxynitride (SiON), or any other compound in the form $SiO_xN_y$, where x and y are integers resulting in sustainable silicon-oxygen-nitrogen compounds, may be applied to all surfaces of the structure 500 using a technique, such as atomic layer deposition, plasma enhanced chemical vapor deposition (PECVD) or vapor deposition, as known to those skilled in the relevant art to serve as an antireflective material. As can be seen in FIG. 12, the $SiO_xN_y$ layer 518 covers all surfaces of the structure 500, top and bottom. The $SiO_xN_y$ layer 518 may even coat the surfaces of the pole bridge 516 so that there is a thin layer of $SiO_xN_y$ (not shown) under the laminate layer 508 and above the substrate 510 in the pole bridge 516. The $SiO_xN_y$ layer 518 may be applied thin so that it can be removed more quickly in another process, such as RIE but sufficient to serve as an antireflective material.

Figure 13:
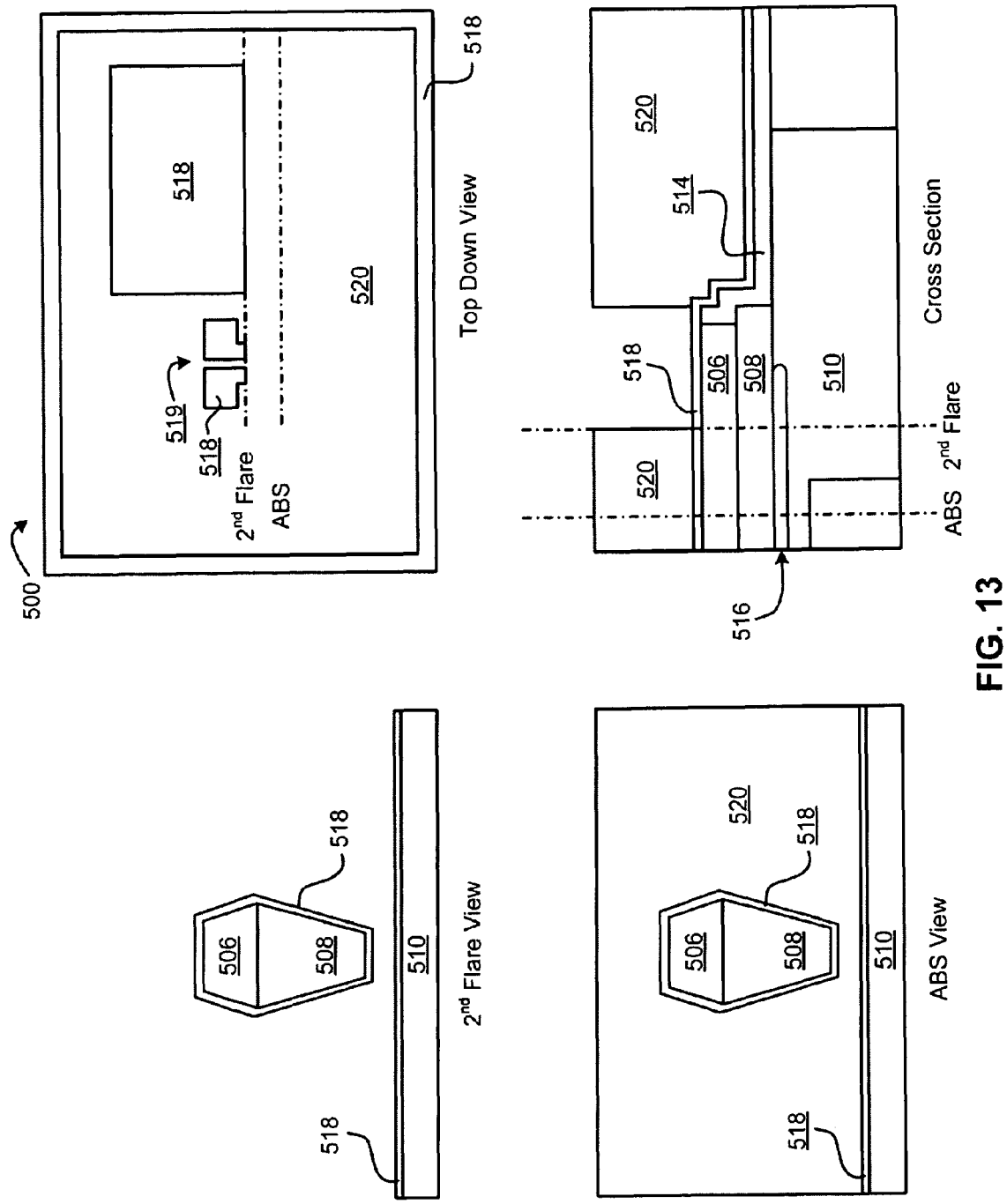

In FIG. 13, another photoresist layer 520 is applied using techniques known to those skilled in the relevant art, leaving the upper portion of the pole structure, typically called the yoke, exposed in a "window." By referring to the $2^{nd}$ Flare and ABS views, it can be seen that at the ABS, the pole structure will be covered with the photoresist layer 520, while at the $2^{nd}$ Flare, the pole structure will not be covered with the photoresist layer 520. By leaving the yoke exposed through the photoresist layer 520, the secondary flare can be "built up" on this structure. As an option, the photo layer 520 may also be used to pattern a WELG 519 (writer electro-lapping guide) in the seed layer area 514. Since the photolithography simultaneously patterns the secondary flare and the WELG, these two structures are self-aligned to each other. Another area to implement the WELG is during the formation of the wraparound shield, which will be discussed later.

In addition, another portion of the structure 500 may remain exposed, which may be used to form an electronic lapping guide (ELG) 519, which may leave the $SiO_xN_y$ layer 518 exposed. Subsequent processing may be performed on the ELG 519 while processing is performed on other portions of the structure 500.

Figure 14:
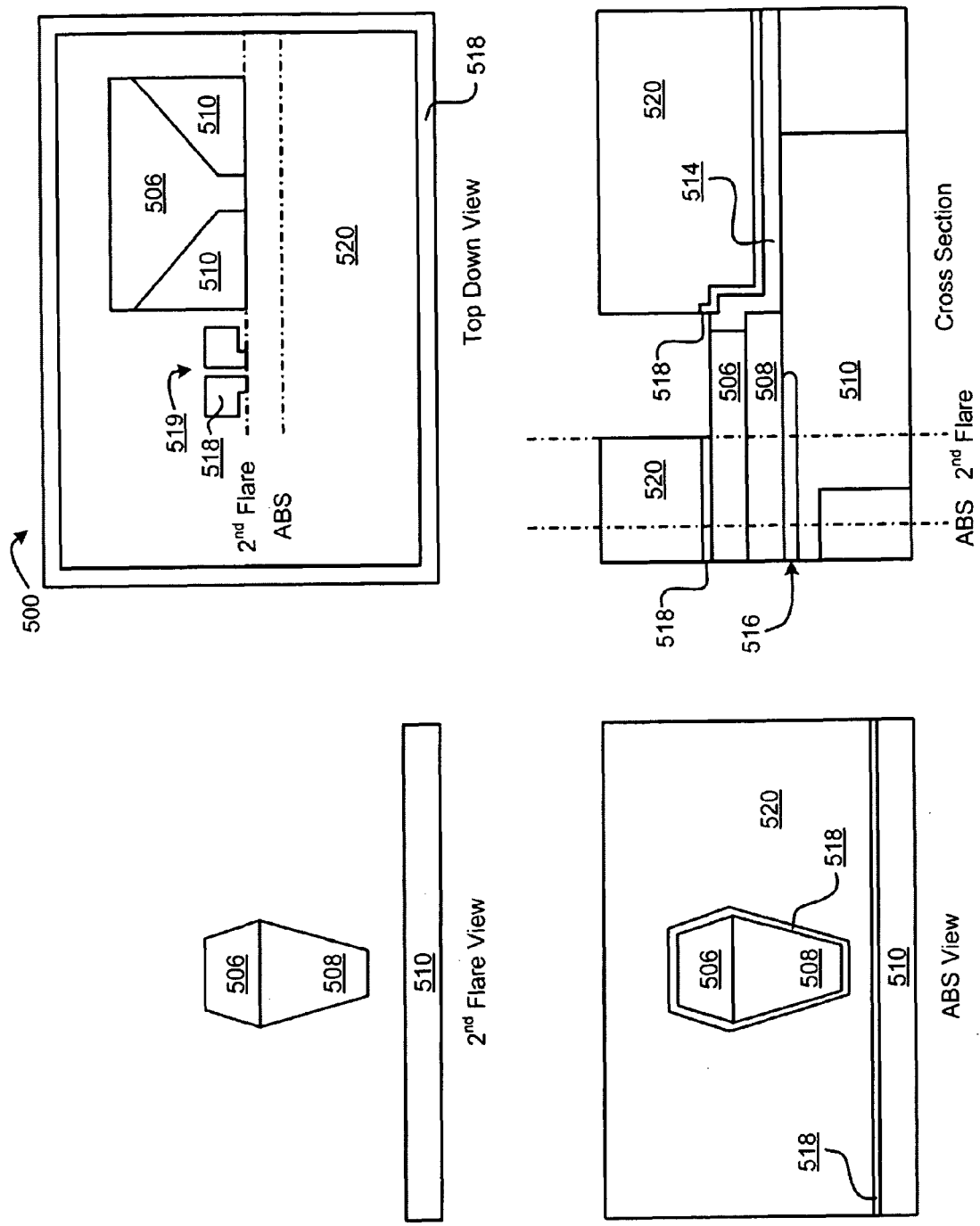

Now referring to FIG. 14, another RE process may be used to remove the $SiO_xN_y$ layer 518 only in the "window" that is exposed, i.e., that is not covered up by the photoresist layer 520 if the optional step of depositing an antireflective material in FIG. 12 is used. This exposes the carbon layer 506 and the substrate 510 that are in the "window." Referring to the ABS view in FIG. 14, it can be seen that at the ABS, the pole structure is still coated with the $SiO_xN_y$ layer 518 and the photoresist layer 520. After the RIE processing, plasma ashing may be used to remove any additional material, possibly in an oxygen or fluorine environment, utilizing a vacuum pump to remove the ash which is formed when the monatomic reactive species combines with the excess material. Also, any other technique known in the relevant art may be used to remove the $SiO_xN_y$ layer 518.

Figure 15:
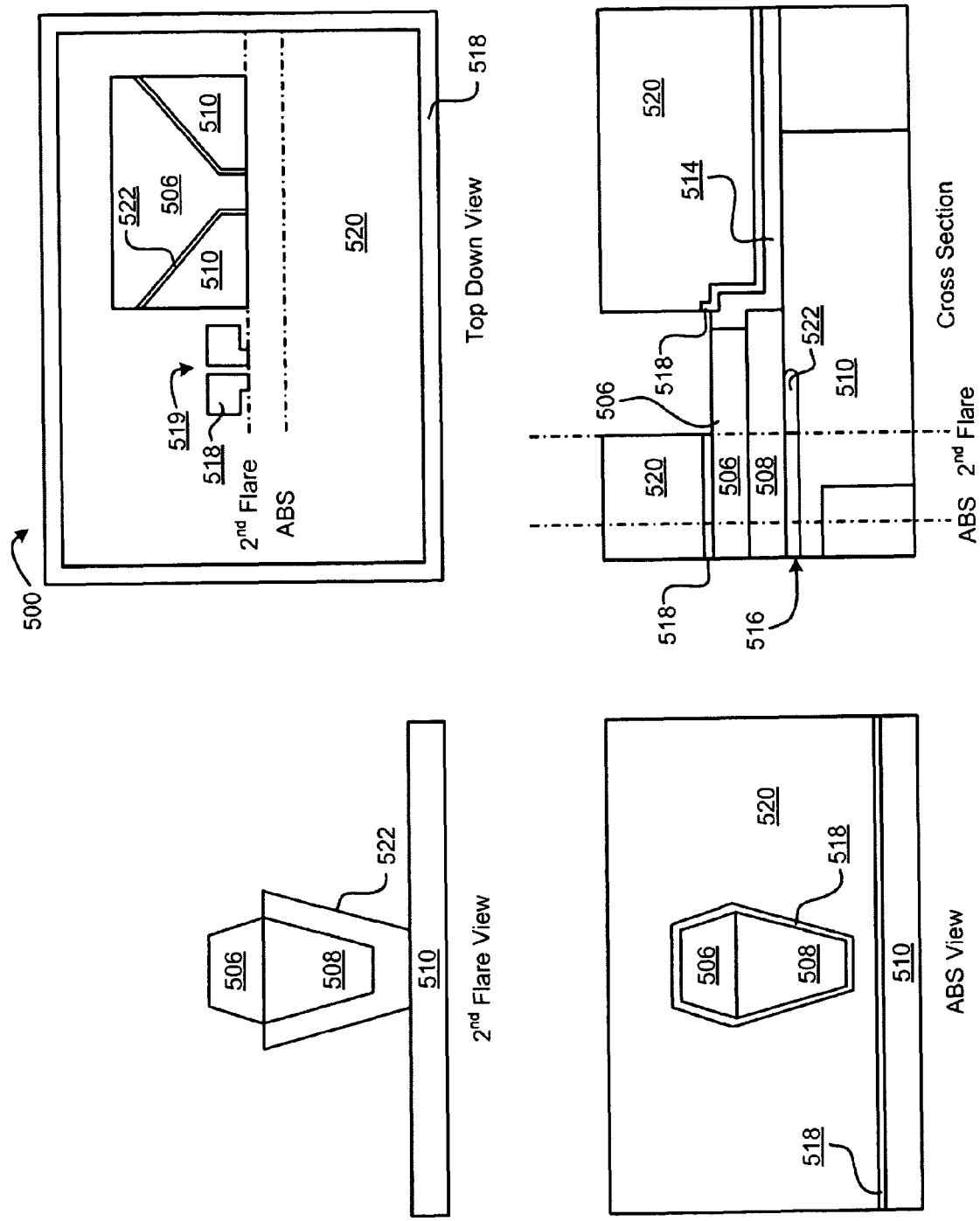

In FIG. 15, a portion of the secondary flare may be added to the structure 500. In the "window" where there is no photoresist layer 520, a cobalt ferrite (CoFe), NiFe, or their alloys layer 522 is formed around the laminate layer 508 such that the pole structure at the $2^{nd}$ Flare and most of the yoke is expanded slightly with the additional material. Preferably, the CoFe layer 522 is plated onto the laminate layer 508 in the "window" using electroplating, but any technique known in the art may be used to form the CoFe layer 522. This CoFe layer 522 will generally form the secondary flare.

Figure 16:
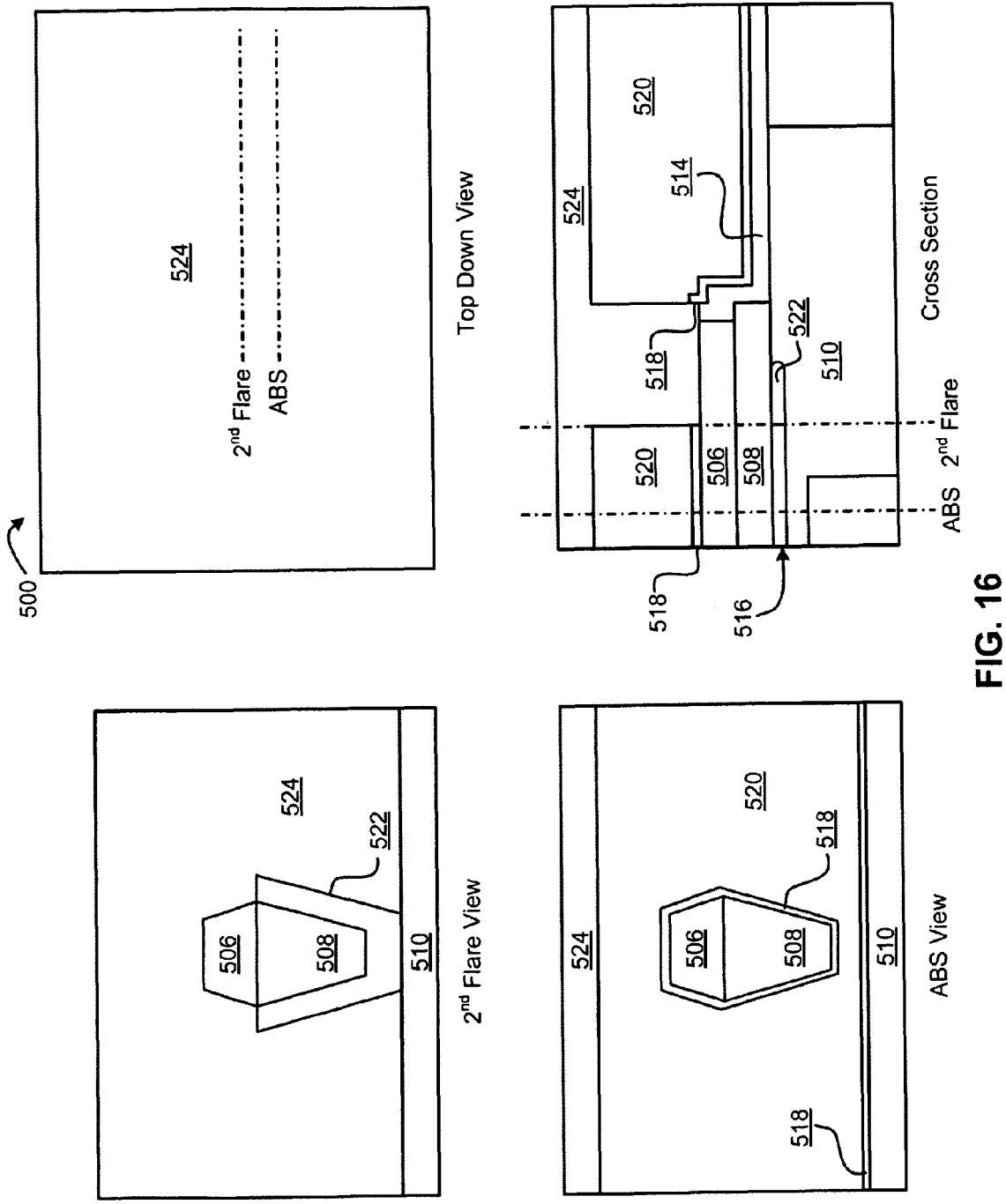
Figure 17:
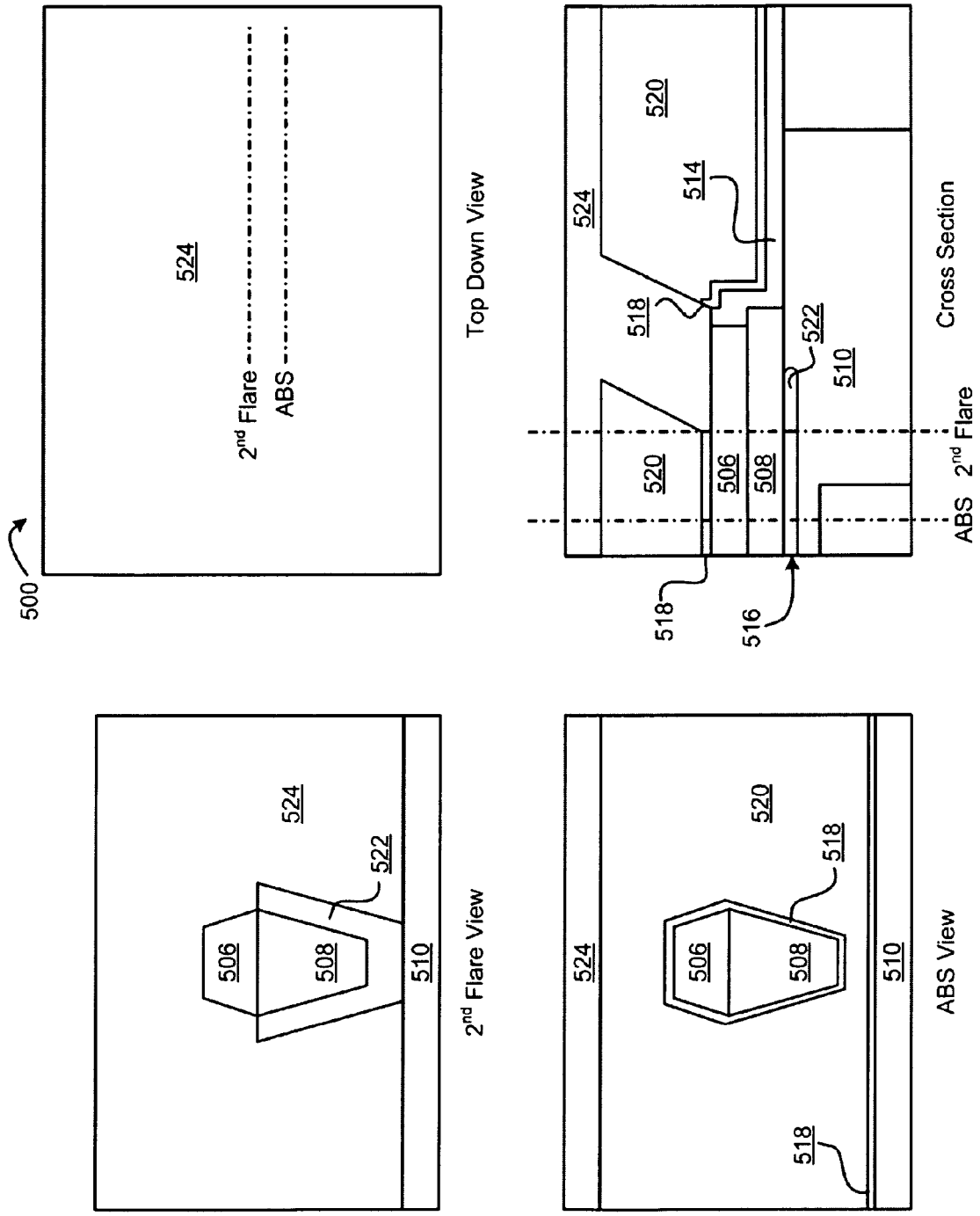

Now referring to FIG. 16, a Safire resist layer 524 (activated through heat) is applied to all surfaces of the structure 500. This Safire resist layer 524 fills the "window" area of the structure 500, as well as the ELG 519. This processing allows for altering of the photoresist layer 520 through heating of the structure 500, which causes the Safire resist layer 524 to expand under the heat, causing the photoresist layer 520 to deform as shown in FIG. 17, most clearly in the Cross Section view.

Figure 18:
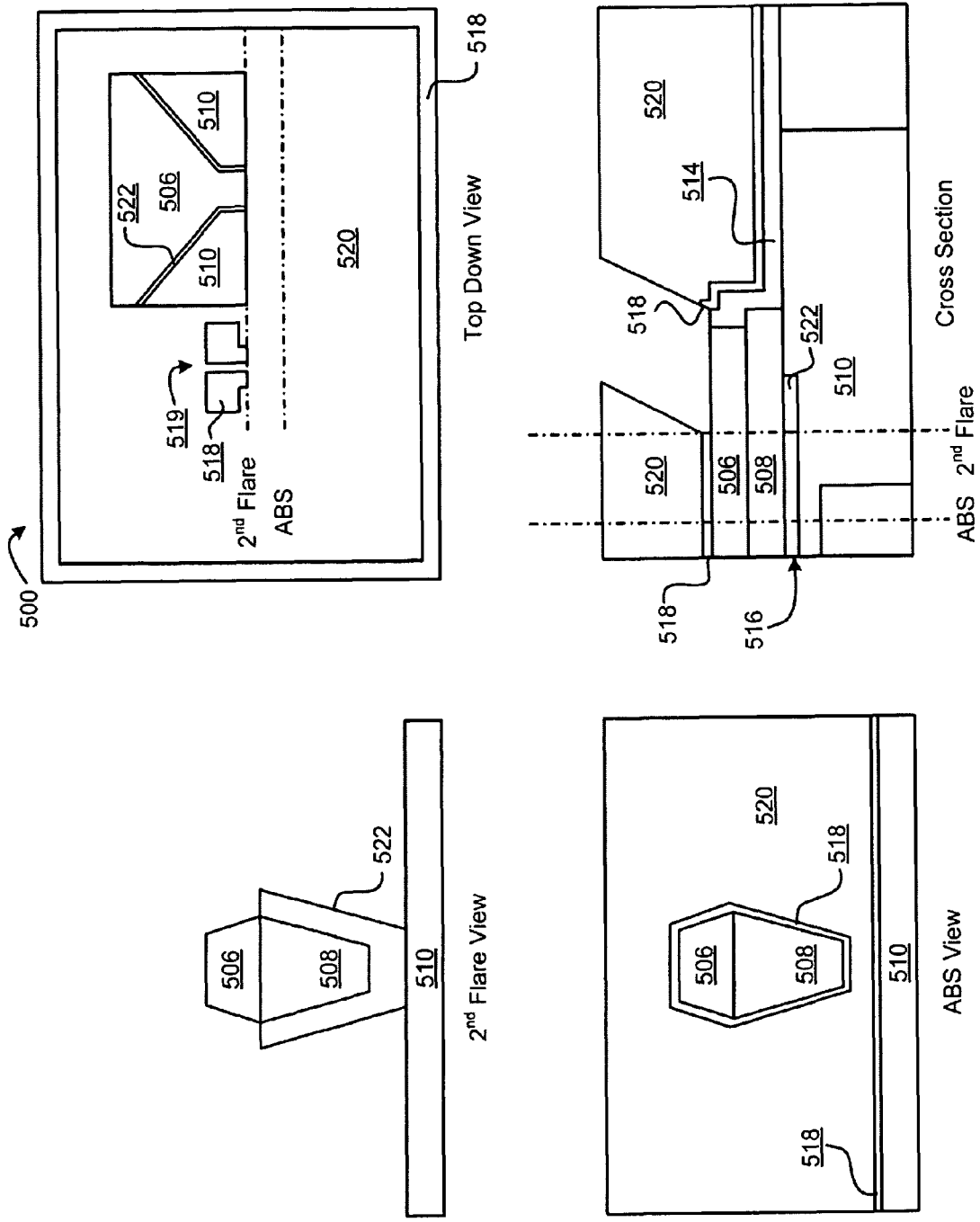

In FIG. 18, the structure is shown with the Safire resist layer 524 removed, preferably through a developer etch where a suitable solvent is used that will remove the Safire resist layer 524 but will not affect the photoresist layer 520. This once again reveals the "window" in the structure 500, exposing the substrate 510, carbon layer 506, and CoFe layer 522, and the ELG 519.

Figure 19:
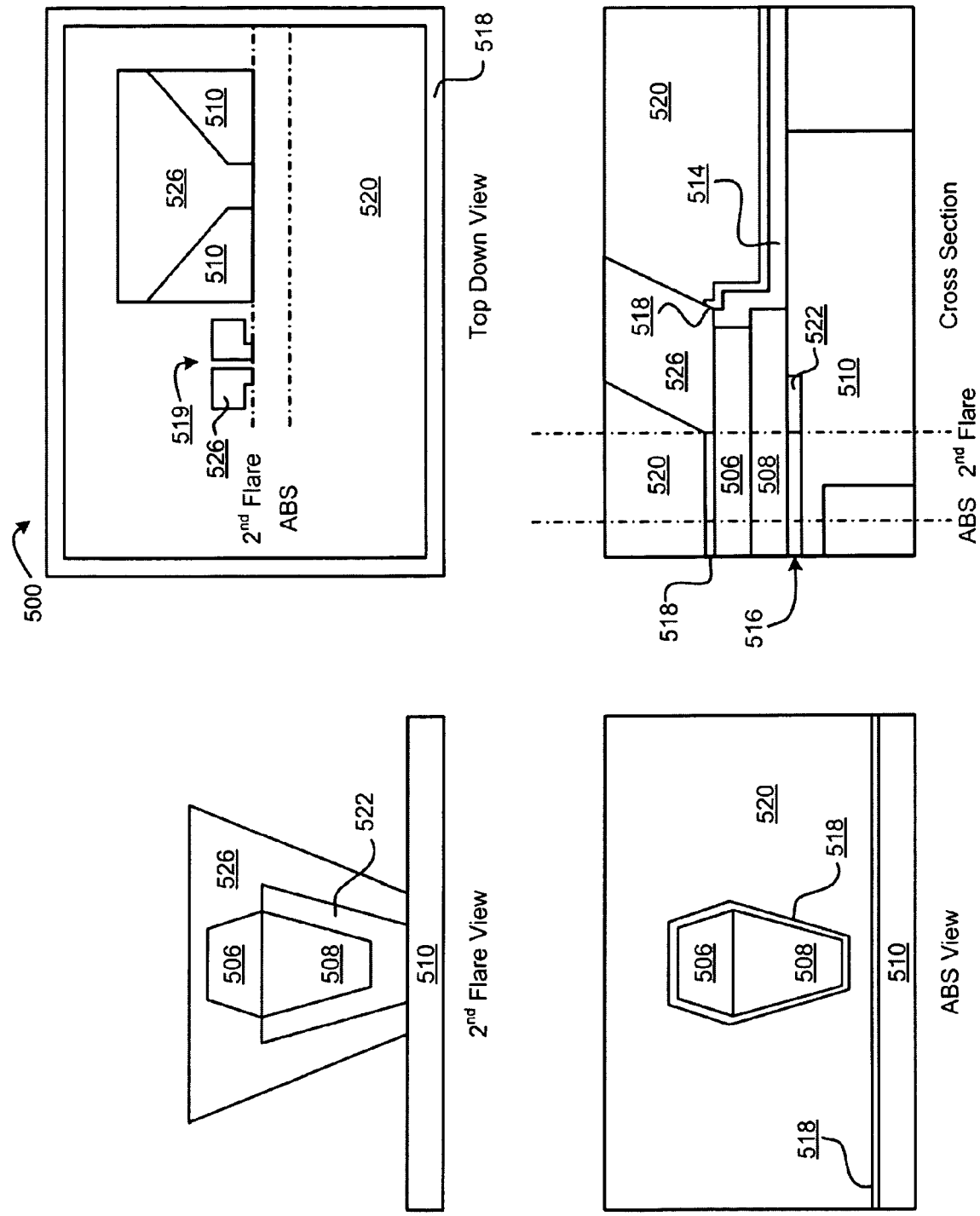

Now referring to FIG. 19, a non-magnetic metallic layer 526 is formed above and around the pole structure at the $2^{nd}$ Flare as shown in the $2^{nd}$ Flare view. As can be seen in the ABS view, the photoresist layer 520 is not plated with the non-magnetic layer 526. The non-magnetic metallic layer 526 is preferably formed through electroplating, but any technique known in the relevant art may be used to plate the pole structure with the non-magnetic metallic layer 526. Note that in this configuration, the carbon layer 506 at the $2^{nd}$ Flare view is preferably left intact to magnetically increase the separation of the write pole and the shield. This is a design for a particular configuration that will minimize effective field leakage from write pole to shield. The secondary plated flare point has magnetic material plated on the bottom and side but not on the top. Other configurations are also contemplated. For example, after the optional RIE removing the $SiO_xN_y$ layer 518, another RIE step is used to remove the carbon layer 506. With carbon layer 506 removed, plating of the magnetic layer would be at the bottom, side, and top. With this design, an effective write field "funnel" to the secondary flare point from four sides is created, thereby maximizing effective field conduction. In addition, the non-magnetic metallic layer 526 may be formed above the ELG 519.

Figure 20:
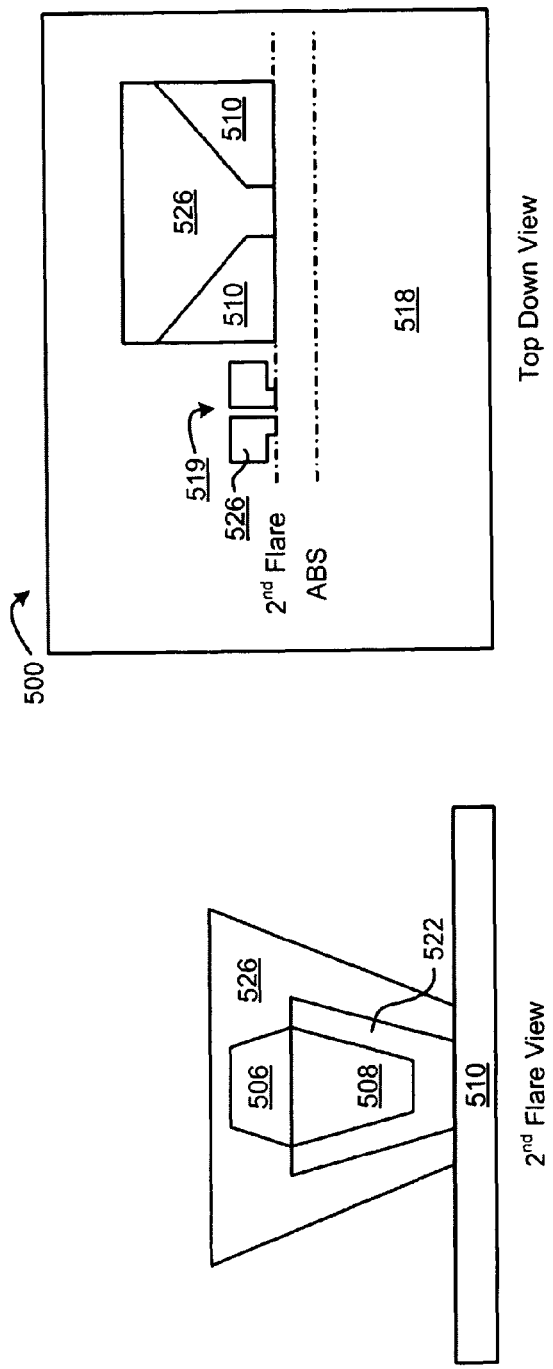
Figure 20:
Figure 20:
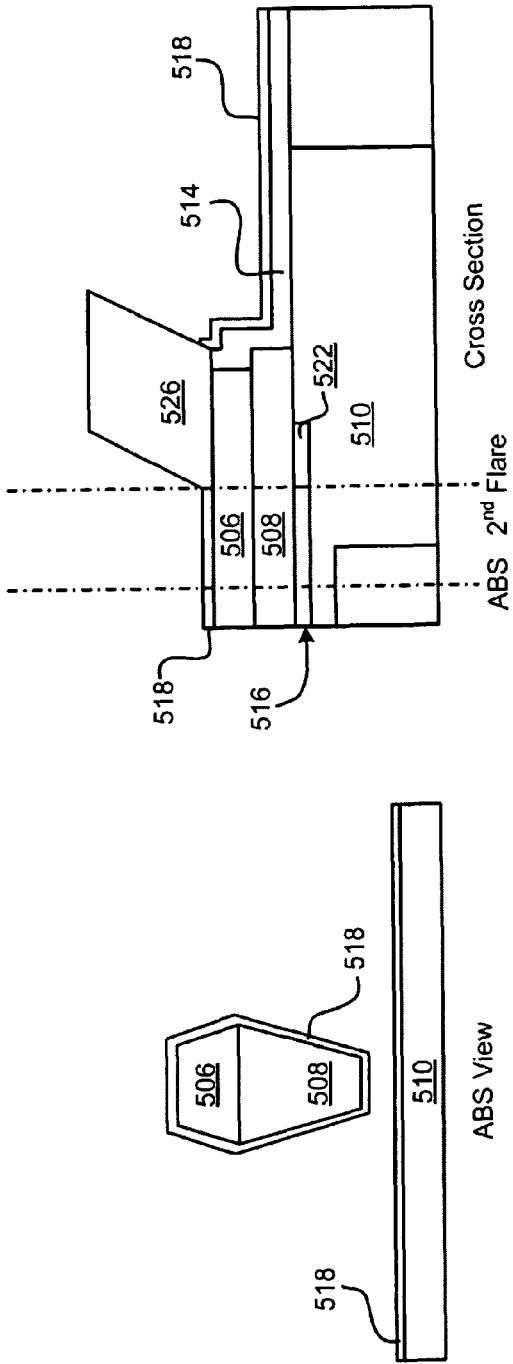

FIG. 20 shows the photoresist layer (520, FIG. 19) removed, through a technique known in the relevant art, such as a NMP strip, preferably applied hot, or a RIE strip, or a combination of techniques.

Figure 21:
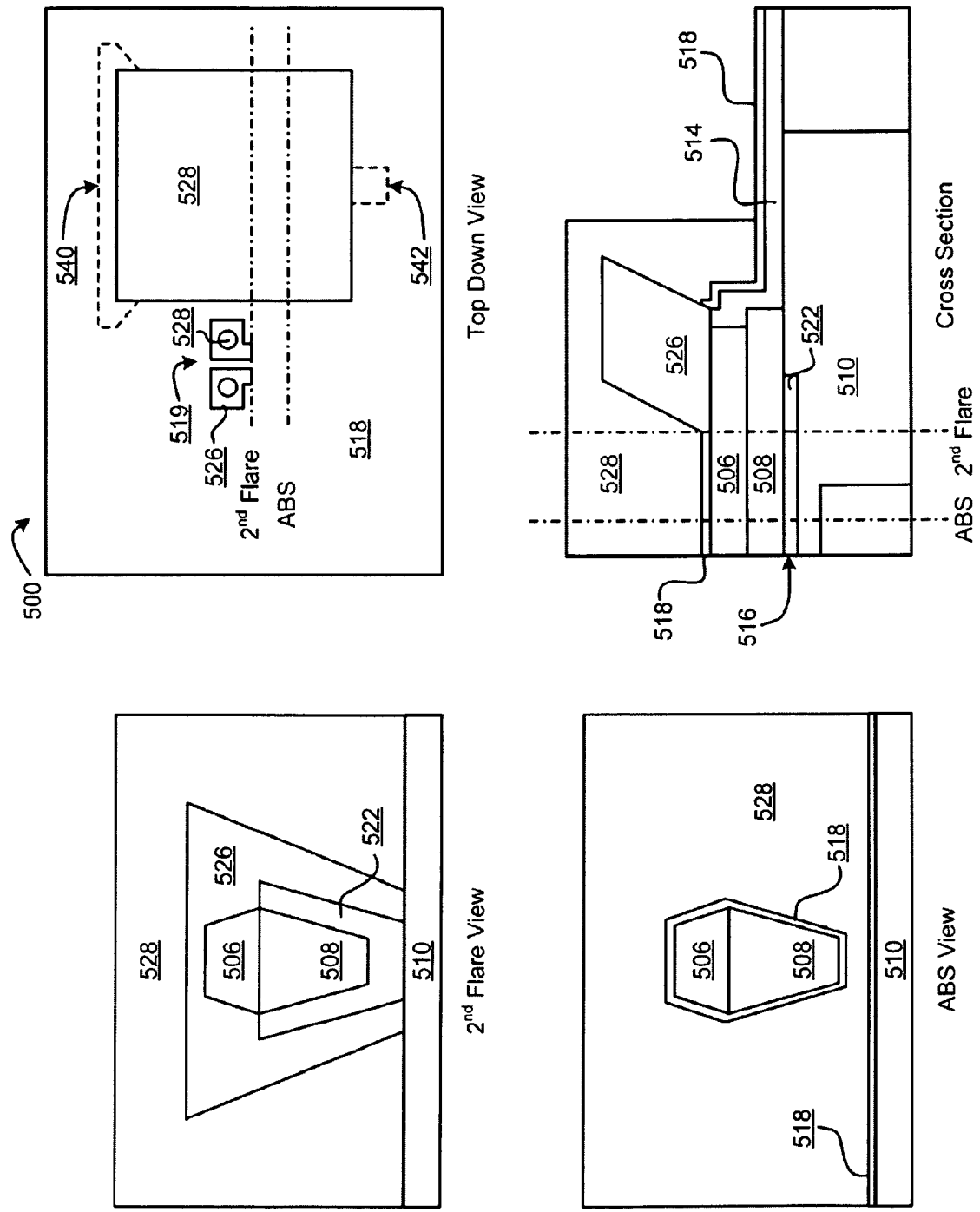

In FIG. 21, if an optional WELG is formed during the photo layer 520 and subsequent processing, a photoresist layer 528 is formed over the ABS and $2^{nd}$ Flare points of the pole structure, but leaving portions of the pole structure uncovered near the back end 540 of the pole structure and the front end 542 of the pole structure. The photoresist layer 528 is applied using techniques known to those skilled in the relevant art. This placement of the photoresist layer 528 allows for defining the WELG to take place without affecting the pole structure near the ABS or $2^{nd}$ Flare points. In addition, portions of the ELG 519 may have photoresist layer 528 formed thereon, thereby defining isolated shapes near the middle of each portion of the ELG 519 (shown as small circles in FIG. 21).

Figure 22:
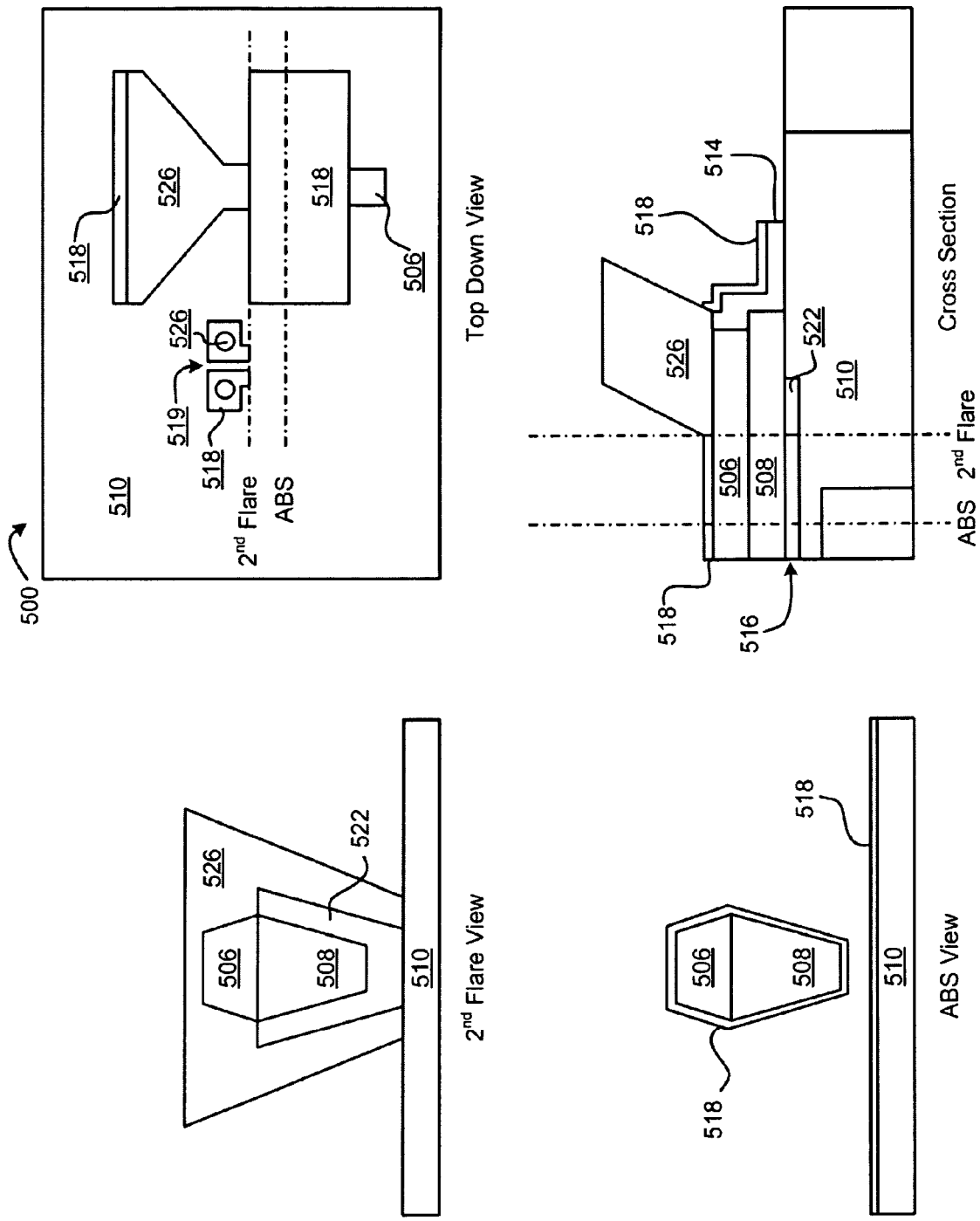

Now referring to FIG. 22, the seed layer 514 and the $SiO_xN_y$ layer 518 may be removed from all the surfaces of the structure 500 except those covered by the photoresist layer (528, FIG. 21) by ion milling to transfer the optional WELG 519 into the seed layer 514. This results in the structure appearing as it does in FIG. 22, with the secondary flare point self-aligned to the WELG 519. 22, with patches of seed layer 514 and $SiO_xN_y$ layer 518 appearing near the back end 540 of the pole structure and near the ABS and $2^{nd}$ Flare points. As can be seen in the ABS and $2^{nd}$ Flare views, the pole structure is quite different at each point in this embodiment, with the pole structure at the $2^{nd}$ Flare point having more material. As shown in FIG. 22, the photoresist layer (528, FIG. 21) may also be removed from the ELG 519, thereby exposing the $SiO_xN_y$ layer 518 and the non-magnetic metallic layer 526 now formed into shapes as defined by the now removed photoresist layer (528, FIG. 21).

Figure 23:
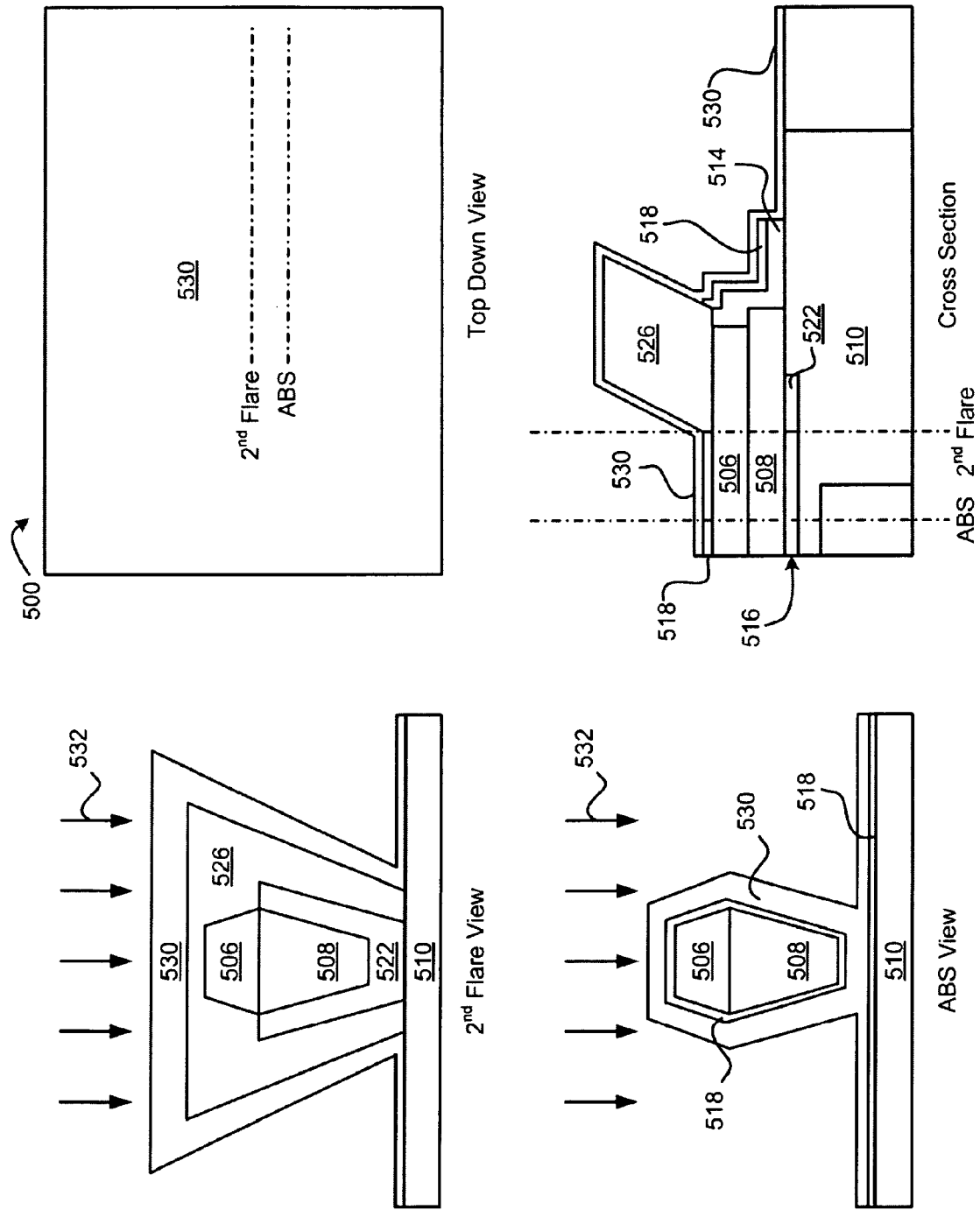

In FIG. 23, an alumina layer 530 is shown coating all surfaces of the structure 500. This alumina layer 530 may be applied through atomic layer deposition (ALD) or through any other technique known to those skilled in the relevant art. After the alumina is deposited, an ion mill 532 step is done to pattern the alumina on the side of the write pole and expose the the carbon layer 506 at the ABS view. In addition to removing the alumina layer 530 above these structures, the ion mill 532 will also remove the $SiO_xN_y$ layer 518 above the carbon layer 506.

Figure 24:
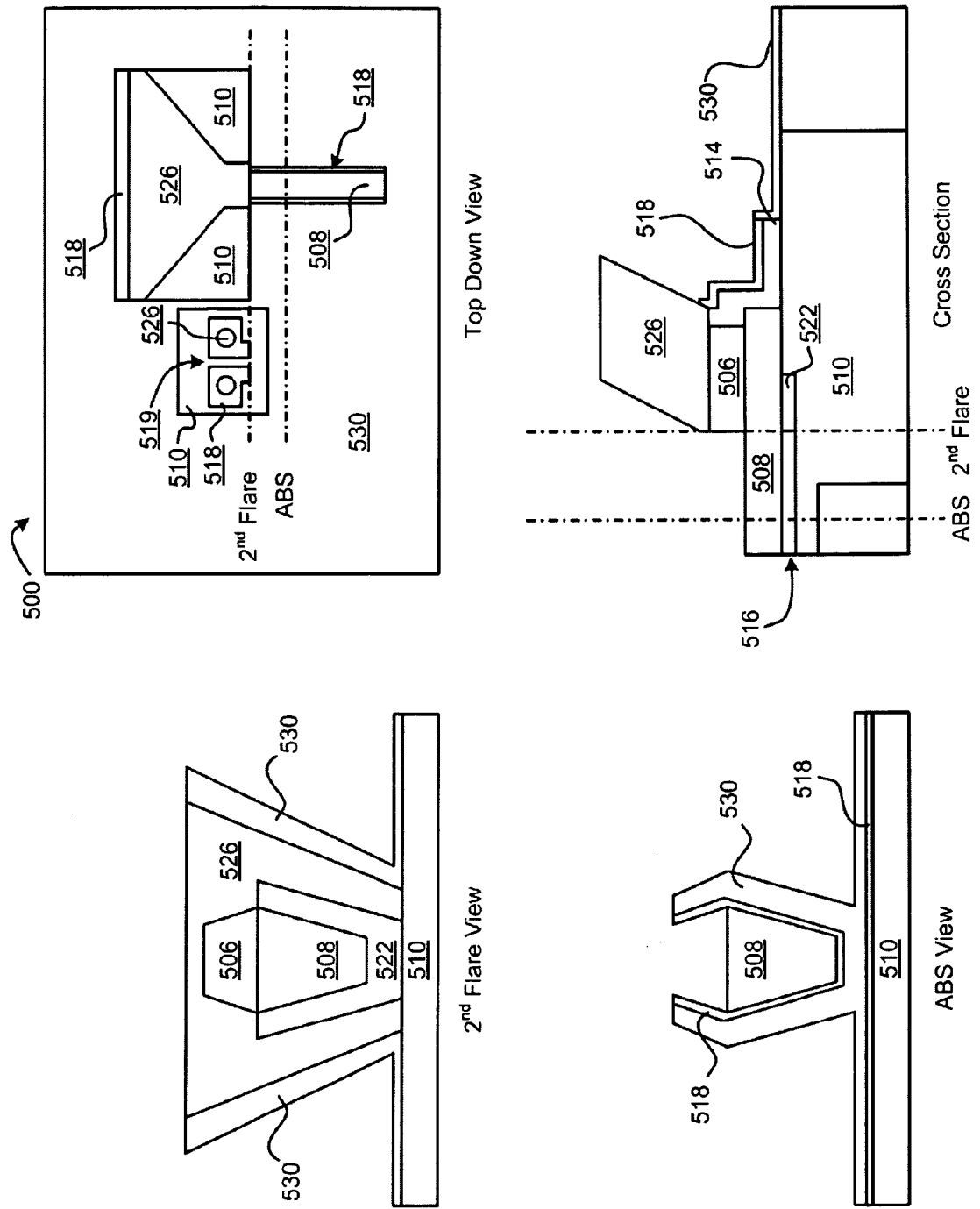

FIG. 24 shows the structure 500 after another process has occurred. Specifically, the exposed carbon layer 506 is removed with a technique known to those skilled in the relevant art, such as RIE and possibly a wet etch. This results in the structure 500 as it appears in the ABS view, where the side walls of the pole structure still intact, but the carbon layer 506 removed. As can be seen in the ABS view and the Top Down view, closer to the front end 542 of the pole structure, a very thin $SiO_xN_y$ layer 518 still surrounds the pole structure.

Figure 25:
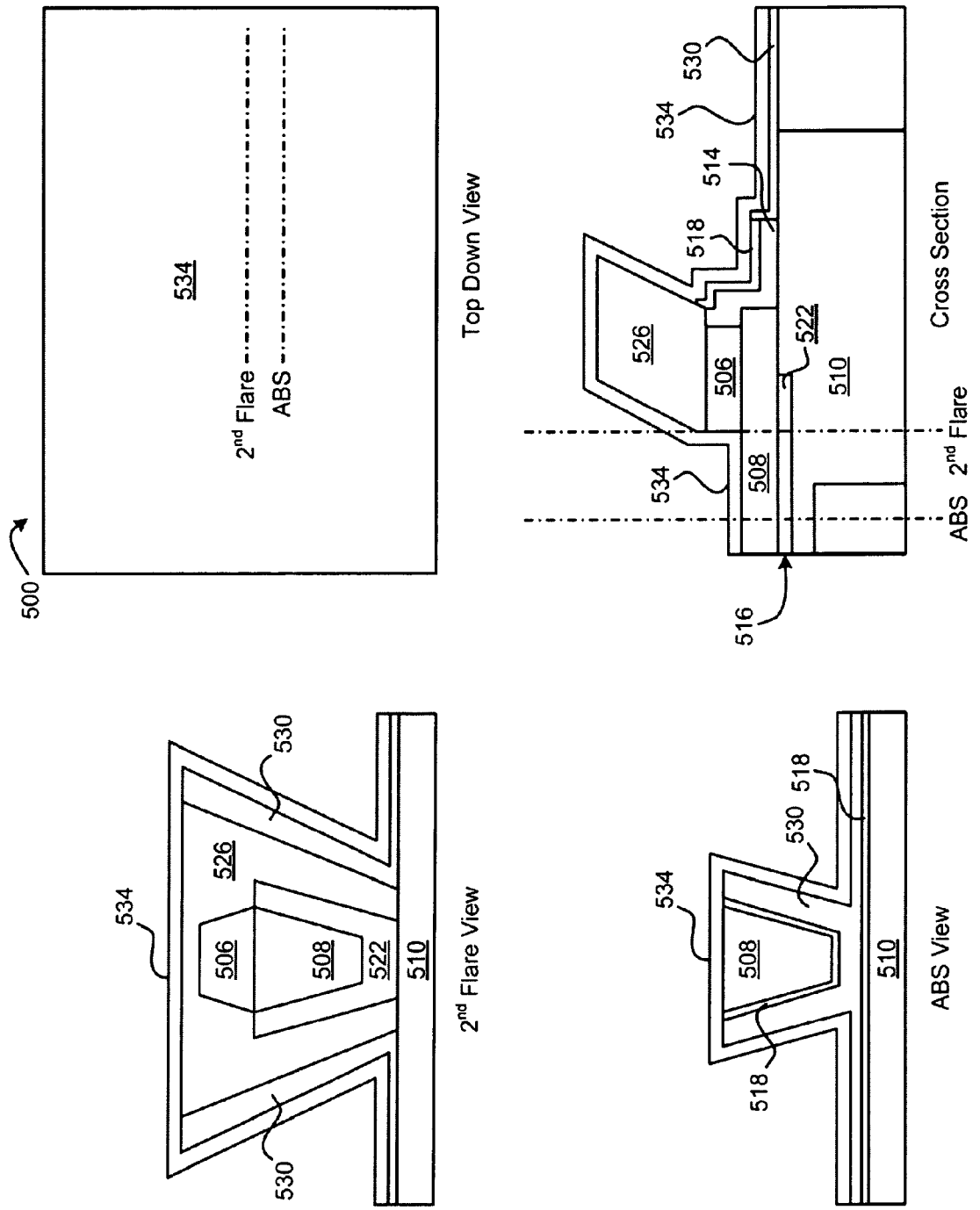

A metal gap layer 534 is shown on all surfaces of the structure 500 in FIG. 25. This metal gap layer 534 serves as a separation between the pole structure and the shield, which may be formed in a subsequent process.

Figure 26:
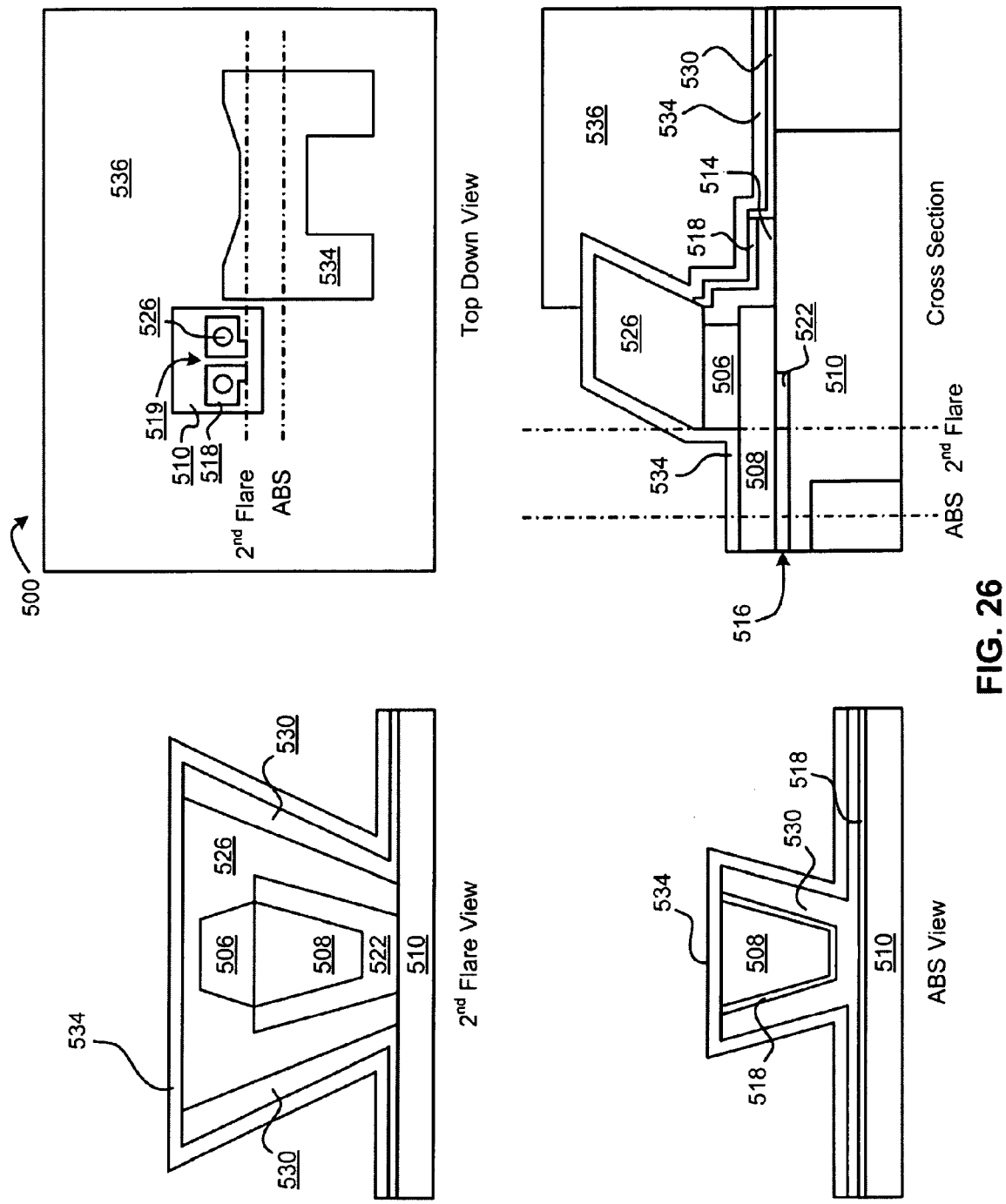

In FIG. 26, a precisely placed photoresist layer 536 is formed, using techniques known to those of skill in the relevant art, over most surfaces except the $2^{nd}$ Flare and ABS points on the pole structure. As can be seen in the Cross Section view, the photoresist layer 536 does not cover the $2^{nd}$ Flare and ABS points, but does cover the back portion of the structure. As an option, a WELG can be formed simultaneously with the wrap-around shield to self-align these two structures.

Figure 27:
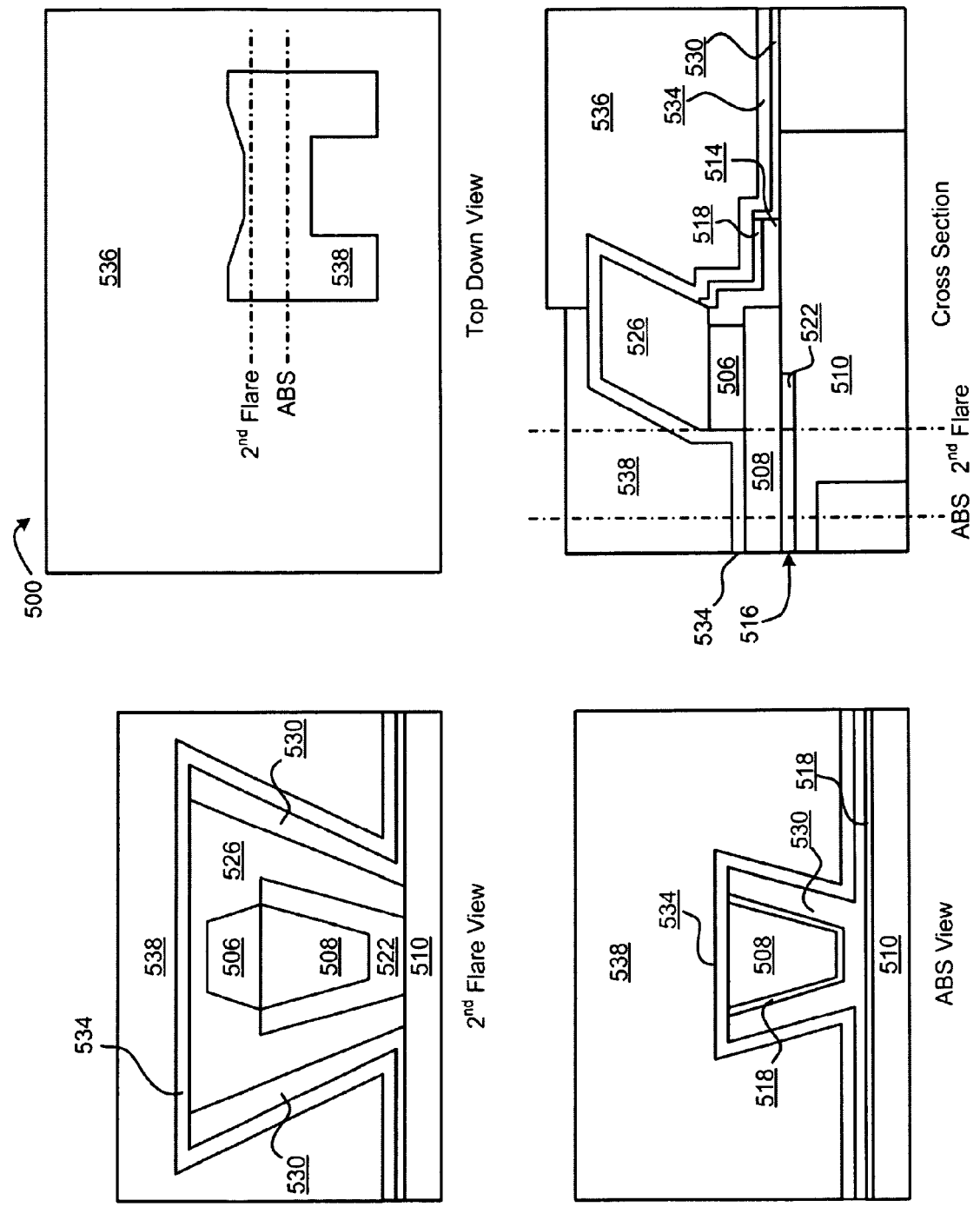

In FIG. 27, the pole material 538 is plated onto the pole structure, possibly through electroplating or some other technique known to those of skill in the relevant art. This material covers both the ABS and $2^{nd}$ Flare points, as can be seen in the $2^{nd}$ Flare, ABS, and Cross Section views. It "fills in" the gap left by the photoresist layer 536, which is roughly the shape of an 'M'.

Figure 28:
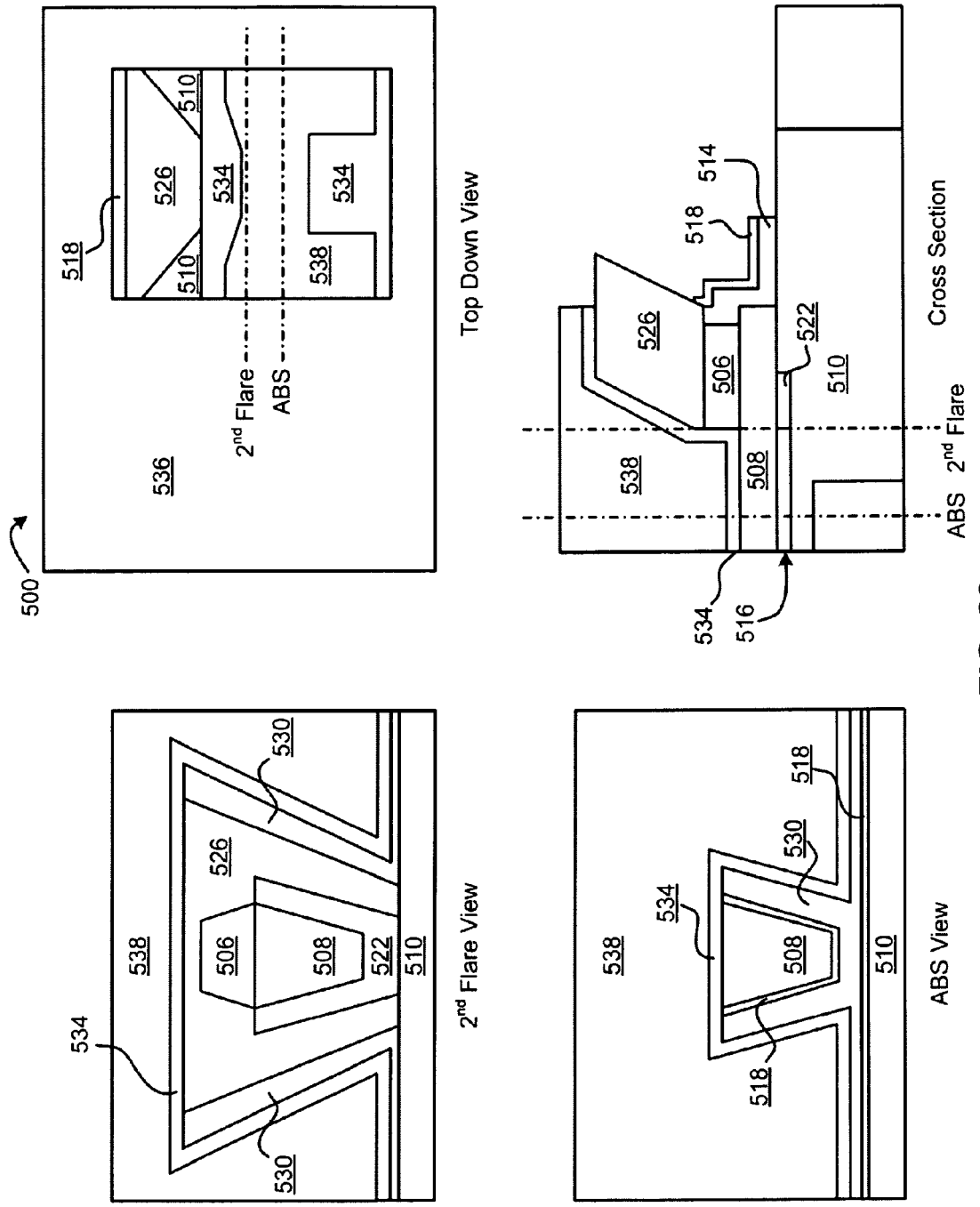

FIG. 28 shows the structure 500 after the photoresist layer 536 has been removed. In this view, there are multiple layers of materials on both the $2^{nd}$ Flare and ABS points of the pole structure. The structure 500 may be further processed to define the ABS along with other processing to create a write pole for a device, such as a hard disk drive, tape drive, etc.

In one embodiment, a width of the write pole at a point between the first (501, FIG. 5) and second flare points (as indicated by the $2^{nd}$ Flare line) is greater than a width of the write pole in the end region. This may be accomplished by plating more material around the write pole to form the second flare point.

In another embodiment, a bottom of the write pole at a point between the first (501, FIG. 5) and second flare points (as indicated by the $2^{nd}$ Flare line) is lower than a bottom of the write pole in the end region. This may be accomplished by plating into the gap under the pole bridge 516.

In other embodiments, the structure 500 may further comprise a layer of nonmagnetic material over the write pole at a point between the first (501, FIG. 5) and second flare points (as indicated by the $2^{nd}$ Flare line), the nonmagnetic material not being over the end region of the write pole. In addition, the layer of nonmagnetic material may have a sloping portion oriented at an angle between 0 and 90 degrees relative to a plane of the ABS (as indicated by the ABS line).

In yet another embodiment, the structure 500 may further comprising a layer of electrically insulating material above the write pole at a point between the first (501, FIG. 5) and second flare points (as indicated by the $2^{nd}$ Flare line) and between the write pole and the shield, wherein the layer of electrically insulating material is not present above the write pole between the end region and the shield. Further, the layer of electrically insulating material may be positioned along sides of the write pole between the shield and the end region, wherein the layer of electrically insulating material may be positioned between the shield and the second flare point.

In still another embodiment, top surfaces of the write pole at the end region and at the second flare point may be about coplanar.

Figure 29:
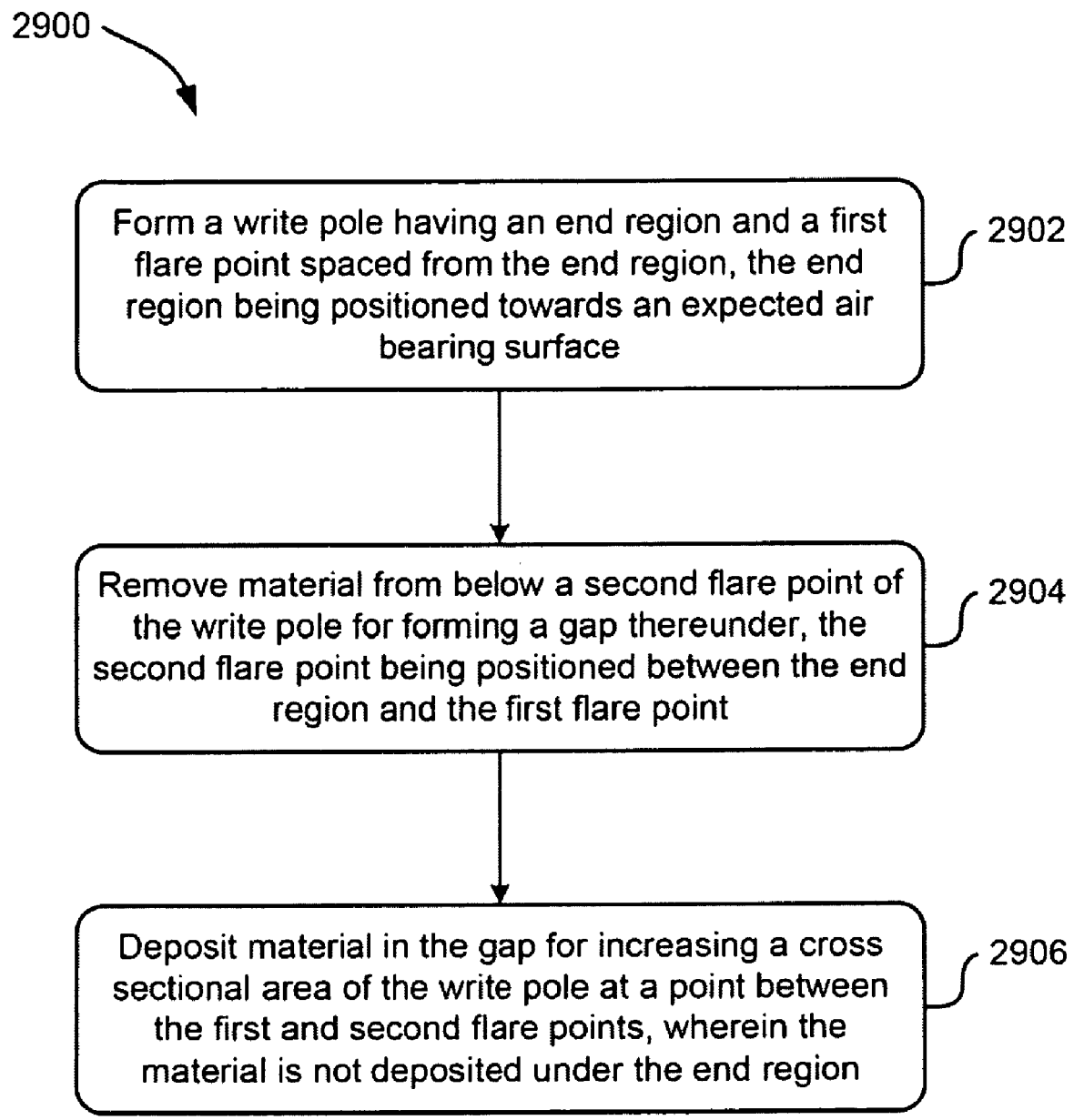
FIG. 29 shows a method according to one embodiment.

FIG. 29 shows a method 2900 according to one embodiment. Method 2900 may be used in conjunction with the functionality and architecture of any of FIGS. 1-28. Also, method 2900 may be used in any environment as desired.

With continued reference to FIG. 29, in operation 2902, a write pole may be formed having an end region and a first flare point spaced from the end region, the end region being positioned towards an expected air bearing surface.

In operation 2904, material from below a second flare point of the write pole may be removed for forming a gap thereunder, the second flare point being positioned between the end region and the first flare point.

In operation 2906, material may be deposited in the gap for increasing a cross sectional area of the write pole at a point between the first and second flare points, wherein the material is not deposited under the end region.

In one embodiment of method 2900, material may also be deposited along sides of the write pole at the second flare point.

In other embodiments of method 2900, a layer of nonmagnetic material may be formed over the write pole at a point between the first and second flare points, wherein the nonmagnetic material may not be formed over the end region of the write pole. Further, the layer of nonmagnetic material may be caused to have a sloping portion oriented at an angle between 0 and 90 degrees relative to a plane of the expected air bearing surface. In addition, a wrap around shield may be formed above the write pole. Furthermore, at least a portion of the back side of the wrap around shield may abut the layer of nonmagnetic material.

In another embodiment of method 2900, a layer of electrically insulating material may be formed above the write pole at a point between the first and second flare points and between the write pole and the shield, wherein the layer of electrically insulating material may not be present above the write pole between the end region and the shield. In addition, the layer of electrically insulating material may be formed along sides of the write pole between the shield and the end region, wherein the layer of electrically insulating material is formed between the shield and the second flare point.

In a further embodiment of method 2900, top surfaces of the write pole at the end region and at the second flare point may be about coplanar.

Figure 30:
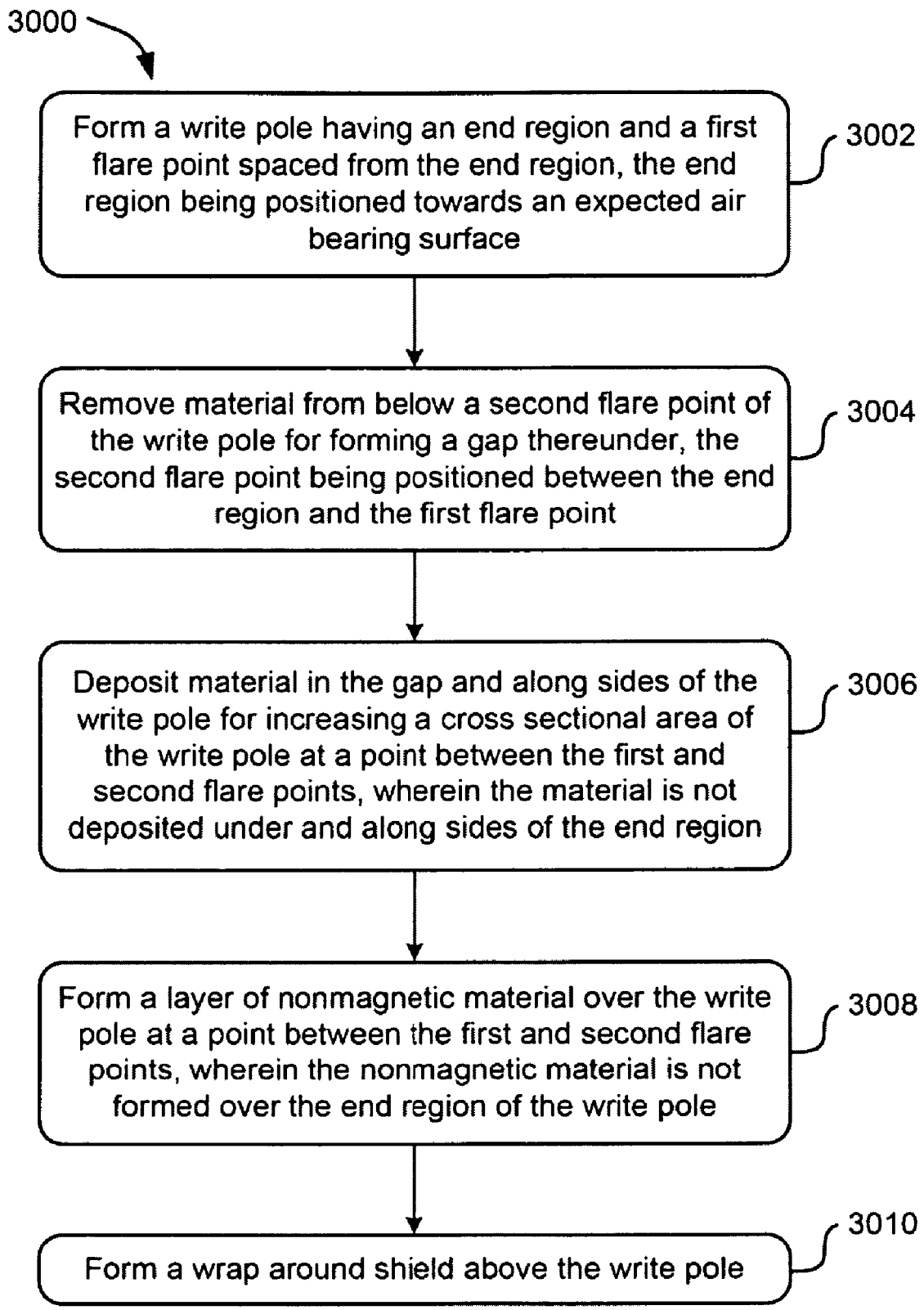
FIG. 30 shows a method according to another embodiment.

Now referring to FIG. 30, a method 3000 according to one embodiment is shown. Method 3000 may be used in conjunction with the functionality and architecture of any of FIGS. 1-28. Also, method 3000 may be used in any environment as desired.

With continued reference to FIG. 30, in operation 3002, a write pole may be formed having an end region and a first flare point spaced from the end region, the end region being positioned towards an expected air bearing surface, i.e., where the air bearing surface is expected to be upon completion of processing. This air bearing surface may resemble the ABS line shown in FIGS. 5-28.

In operation 3004, material may be removed from below a second flare point of the write pole for forming a gap thereunder, the second flare point being positioned between the end region and the first flare point.

In operation 3006, material may be deposited in the gap and along sides of the write pole for increasing a cross sectional area of the write pole at a point between the first and second flare points, wherein the material is not deposited under and along sides of the end region.

In operation 3008, a layer of nonmagnetic material may be formed over the write pole at a point between the first and second flare points, wherein the nonmagnetic material is not formed over the end region of the write pole.

In operation 3010, a wrap around shield may be formed above the write pole.

In one embodiment, the layer of nonmagnetic material may be caused to have a sloping portion oriented at an angle between 0 and 90 degrees relative to a plane of the expected air bearing surface.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
a write pole having an end region positioned towards an air bearing surface, a first flare point, and a second flare point positioned between the air bearing surface and the first flare point; and
a shield positioned above the write pole,
wherein a cross sectional area of the write pole at a point between the first and second flare points along a plane passing through the write pole and oriented about parallel to the air bearing surface is greater than a cross sectional area of the end region of the write pole along a plane oriented parallel to the plane passing through the second flare point, wherein the cross-sectional area of the write pole at the point between the first and second flare points is increased by a second layer of a cobalt ferrite, NiFe, or alloys thereof positioned on sides and/or under the write pole.

2. A system as recited in claim 1, wherein a width of the write pole at a point between the first and second flare points is greater than a width of the write pole in the end region.

3. A system as recited in claim 1, wherein a bottom of the write pole at a point between the first and second flare points is lower than a bottom of the write pole in the end region.

4. A system as recited in claim 1, further comprising a layer of nonmagnetic material over the write pole at a point between the first and second flare points, the nonmagnetic material not being over the end region of the write pole.

5. A system as recited in claim 4, wherein the layer of nonmagnetic material has a sloping portion oriented at an angle between 0 and 90 degrees relative to a plane of the air bearing surface.

6. A system as recited in claim 1, further comprising a layer of electrically insulating material above the write pole at a point between the first and second flare points and between the write pole and the shield, wherein the layer of electrically insulating material is not present above the write pole, between the end region and the shield.

7. A system as recited in claim 6, wherein the layer of electrically insulating material is positioned along sides of the write pole between the shield and the end region, wherein the layer of electrically insulating material is positioned between the shield and the write pole at the second flare point.

8. A system as recited in claim 1, wherein top surfaces of the write pole at the end region and at the second flare point are about coplanar.

9. A method for forming the system of claim 1, comprising:
forming the write pole having the end region and the first flare point spaced from the end region, the end region being positioned towards an expected position of the air bearing surface;
removing material from below the second flare point of the write pole for forming a gap thereunder, the second flare point being positioned between the end region and the first flare point; and
depositing the second layer in the gap for increasing a cross sectional area of the write pole at a point between the first and second flare points, wherein the second layer is not deposited under the end region.

10. A method as recited in claim 9, wherein the second layer is also deposited along sides of the write pole at the second flare point.

11. A method as recited in claim 9, further comprising forming a layer of nonmagnetic material over the write pole at a point between the first and second flare points, wherein the nonmagnetic material is not formed over the end region of the write pole.

12. A method as recited in claim 11, further comprising causing the layer of nonmagnetic material to have a sloping portion oriented at an angle between 0 and 90 degrees relative to a plane of the expected air bearing surface.

13. A method as recited in claim 11, further comprising forming a wrap around shield above the write pole.

14. A method as recited in claim 13, wherein at least a portion of the back side of the wrap around shield abuts the layer of nonmagnetic material.

15. A method as recited in claim 9, further comprising forming a layer of electrically insulating material above the write pole at a point between the first and second flare points and between the write pole and the shield, wherein the layer of electrically insulating material is not present above the write pole between the end region and the shield.

16. A method as recited in claim 15, wherein the layer of electrically insulating material is formed along sides of the write pole between the shield and the end region, wherein the layer of electrically insulating material is formed between the shield and the second flare point.

17. A method as recited in claim 9, wherein top surfaces of the write pole at the end region and at the second flare point are about coplanar.

18. A method for forming the system of claim 1, comprising:
forming the write pole having the end region and the first flare point spaced from the end region, the end region being positioned towards an expected position of the air bearing surface;
removing material from below the second flare point of the write pole for forming a gap thereunder, the second flare point being positioned between the end region and the first flare point;
depositing the second layer in the gap and along sides of the write pole for increasing the cross sectional area of the write pole at a point between the first and second flare points, wherein the second layer is not deposited under and along sides of the end region;
forming a layer of nonmagnetic material over the write pole at a point between the first and second flare points, wherein the nonmagnetic material is not formed over the end region of the write pole; and
forming a wrap around shield above the write pole.

19. A method as recited in claim 18, further comprising causing the layer of nonmagnetic material to have a sloping portion oriented at an angle between 0 and 90 degrees relative to a plane of the expected air bearing surface.

20. A system, comprising:
a write pole having an end region positioned towards an air bearing surface, a first flare point, and a second flare point positioned between the air bearing surface and the first flare point; and
a shield positioned above the write pole,
wherein a width of the write pole at the second flare point is greater than a width of the write pole in the end region,
wherein a bottom of the write pole at the second flare point is lower than a bottom of the write pole in the end region,
wherein a cross sectional area of the write pole at a point between the first and second flare points along a plane passing through the write pole and oriented about parallel to the air bearing surface is greater than a cross sectional area of the end region of the write pole along a plane oriented parallel to the plane passing through the second flare point, wherein the cross-sectional area of the write pole at the point between the first and second flare points is increased by a second layer of a cobalt ferrite, NiFe, or alloys thereof positioned on sides and/or under the write pole.

21. A system as recited in claim 20, further comprising a layer of nonmagnetic material over the write pole at a point between the first and second flare points, the nonmagnetic material not being over the end region of the write pole.

22. A system as recited in claim 21, wherein the layer of nonmagnetic material has a sloping portion oriented at an angle between 0 and 90 degrees relative to a plane of the air bearing surface.

23. A system as recited in claim 20, further comprising a layer of electrically insulating material above the write pole at a point between the first and second flare points and between the write pole and the shield, wherein the layer of electrically insulating material is not present above the write pole between the end region and the shield.

24. A system as recited in claim 23, wherein the layer of electrically insulating material is positioned along sides of the write pole between the shield and the end region, wherein the layer of electrically insulating material is positioned between the shield and the second flare point.

25. A system as recited in claim 20, wherein top surfaces of the write pole at the end region and at the second flare point are about coplanar.

* * * * *

UNITED STATES PATENT AND TRADEMARK OFFICE
CERTIFICATE OF CORRECTION

| | | |
|---|---|---|
| PATENT NO. | : 8,259,413 B2 | Page 1 of 1 |
| APPLICATION NO. | : 12/347058 | |
| DATED | : September 4, 2012 | |
| INVENTOR(S) | : Bonhôte et al. | |

It is certified that error appears in the above-identified patent and that said Letters Patent is hereby corrected as shown below:

In the specification:

col. 2, line 56, replace "2F" with --2E--;

col. 9, line 17, replace "RE" with --RIE--.

Signed and Sealed this
Eighth Day of January, 2013

David J. Kappos
*Director of the United States Patent and Trademark Office*